(12) United States Patent
Tomoda et al.

(10) Patent No.: US 10,037,769 B1
(45) Date of Patent: Jul. 31, 2018

(54) MAGNETIC DISK DEVICE AND WRITE PROCESSING METHOD

(71) Applicant: Kabushiki Kaisha Toshiba, Minato-ku, Tokyo (JP)

(72) Inventors: Yusuke Tomoda, Kanagawa (JP); Koji Yano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/691,914

(22) Filed: Aug. 31, 2017

(30) Foreign Application Priority Data

Mar. 1, 2017 (JP) .................................. 2017-038577

(51) Int. Cl.
G11B 21/02 (2006.01)
G11B 5/02 (2006.01)
G11B 5/115 (2006.01)

(52) U.S. Cl.
CPC .............. *G11B 5/022* (2013.01); *G11B 5/115* (2013.01)

(58) Field of Classification Search
CPC . G11B 21/1426; G11B 5/09; G11B 20/10009; G11B 5/012; G11B 5/035; G11B 5/6005; G11B 5/59633; G11B 5/54
USPC .................... 360/40, 46, 65, 51, 75
See application file for complete search history.

(56) References Cited

U.S. PATENT DOCUMENTS

| 6,301,068 | B1* | 10/2001 | Ionescu .................. | G11B 5/012 360/40 |
| 6,930,846 | B2* | 8/2005 | Nakamura ............. | G11B 5/012 360/46 |
| 7,796,355 | B2* | 9/2010 | Benakli ................... | G11B 5/02 360/68 |
| 8,670,201 | B2* | 3/2014 | Matsubara ........... | G11B 5/3133 360/51 |
| 8,687,311 | B2 | 4/2014 | Dakroub et al. | |
| 8,867,161 | B2 | 10/2014 | Emo et al. | |
| 8,953,273 | B1* | 2/2015 | Funayama ............. | G11B 5/012 360/46 |
| 2012/0250174 | A1 | 10/2012 | Sueishi et al. | |

* cited by examiner

*Primary Examiner* — Nabil Hindi
(74) *Attorney, Agent, or Firm* — White & Case LLP

(57) ABSTRACT

According to one embodiment, a magnetic disk device includes a disk, a head including a main pole configured to apply a recording magnetic field to the disk, and side shields provided in a first direction with respect to the main pole and possessing a magnetic field in the magnetization direction of the first direction, and a controller configured to output a recording current in which a magnitude of a first electric current and a magnitude of a second electric current opposite to the first electric current in direction of the current are different from each other to the head according to the magnetic field of the side shields.

6 Claims, 18 Drawing Sheets

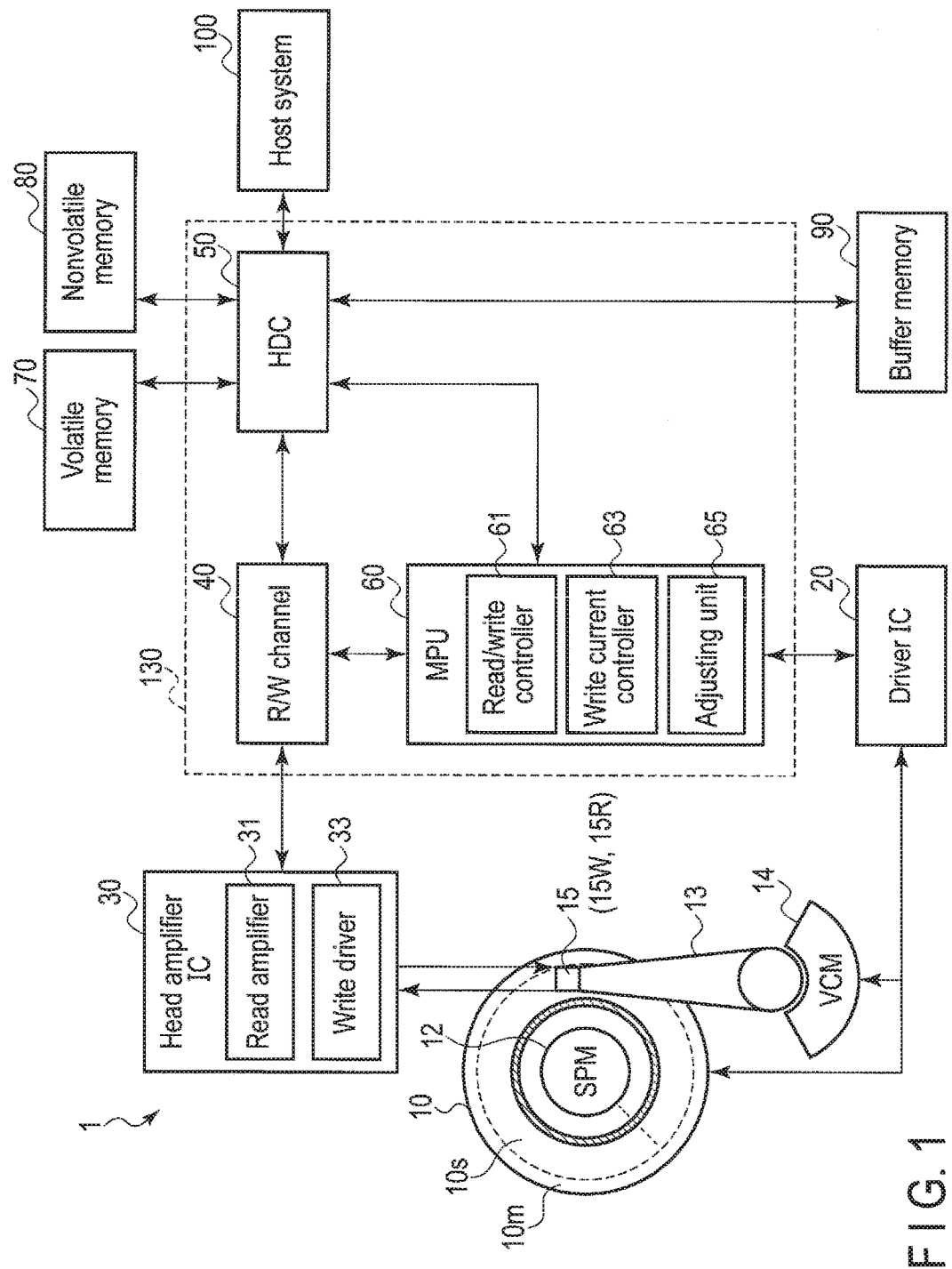
F I G. 1

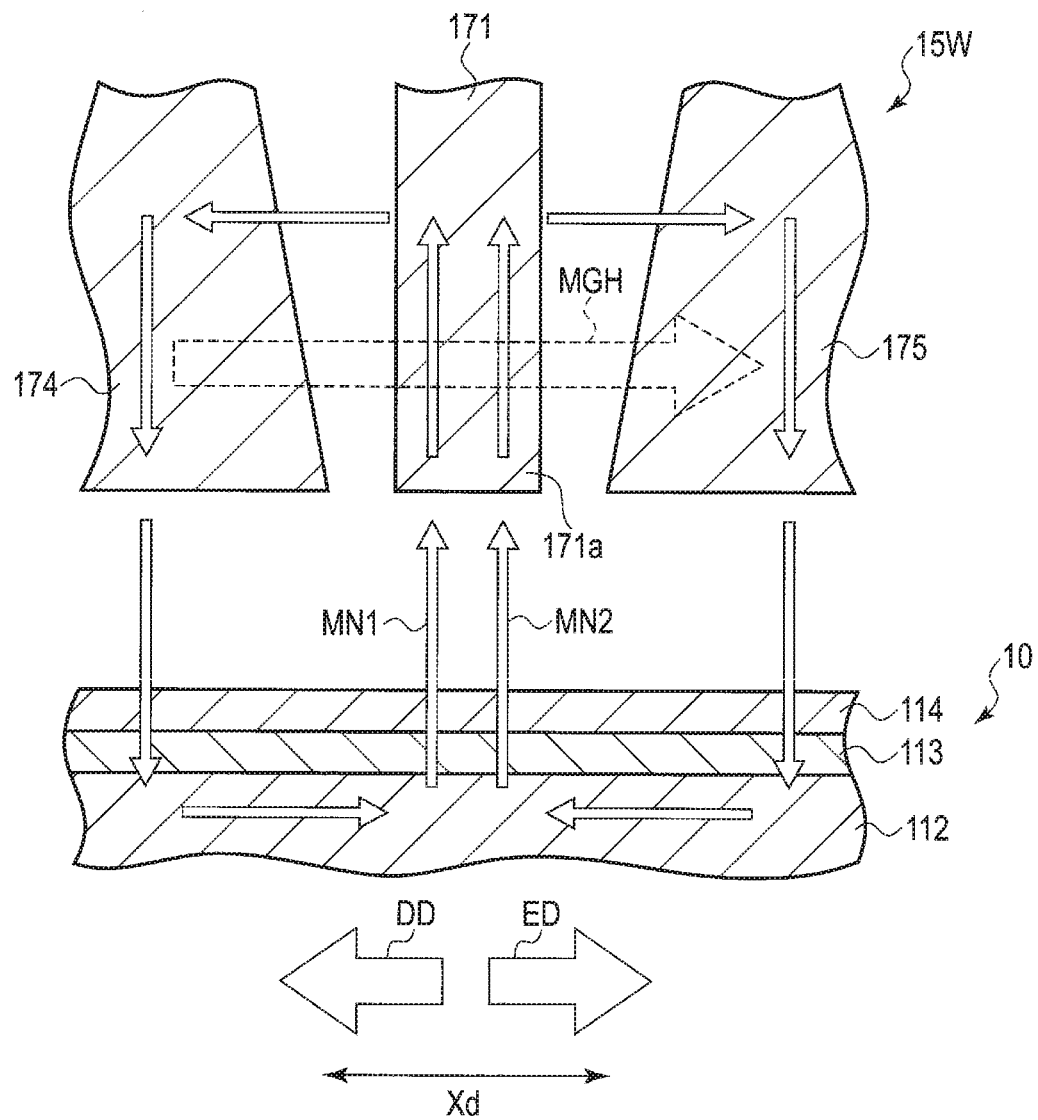
F I G. 5B

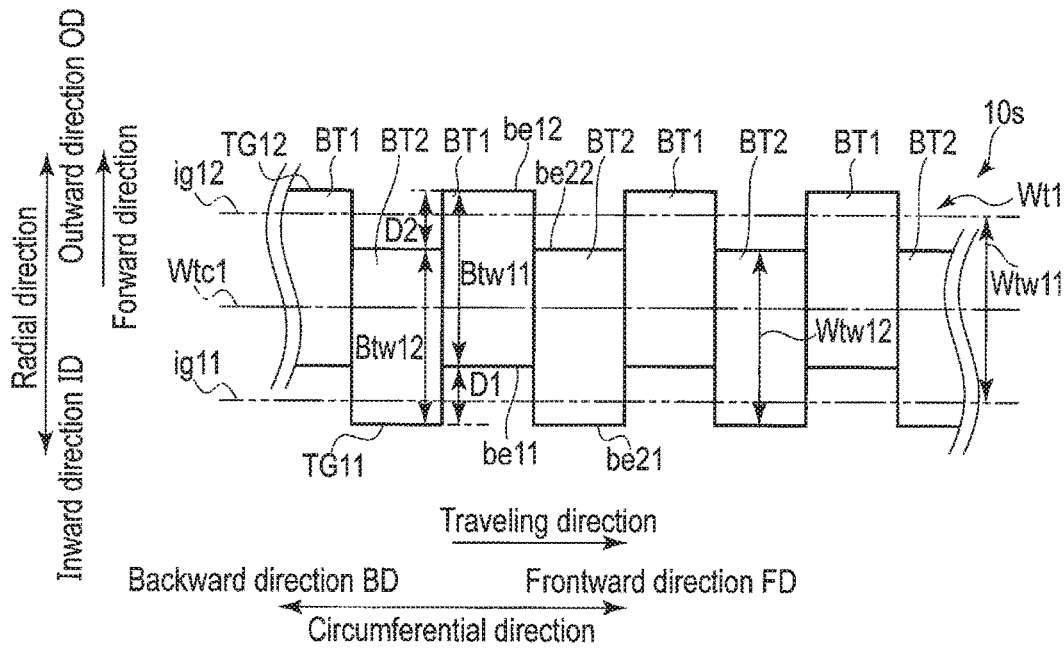
F I G. 8A
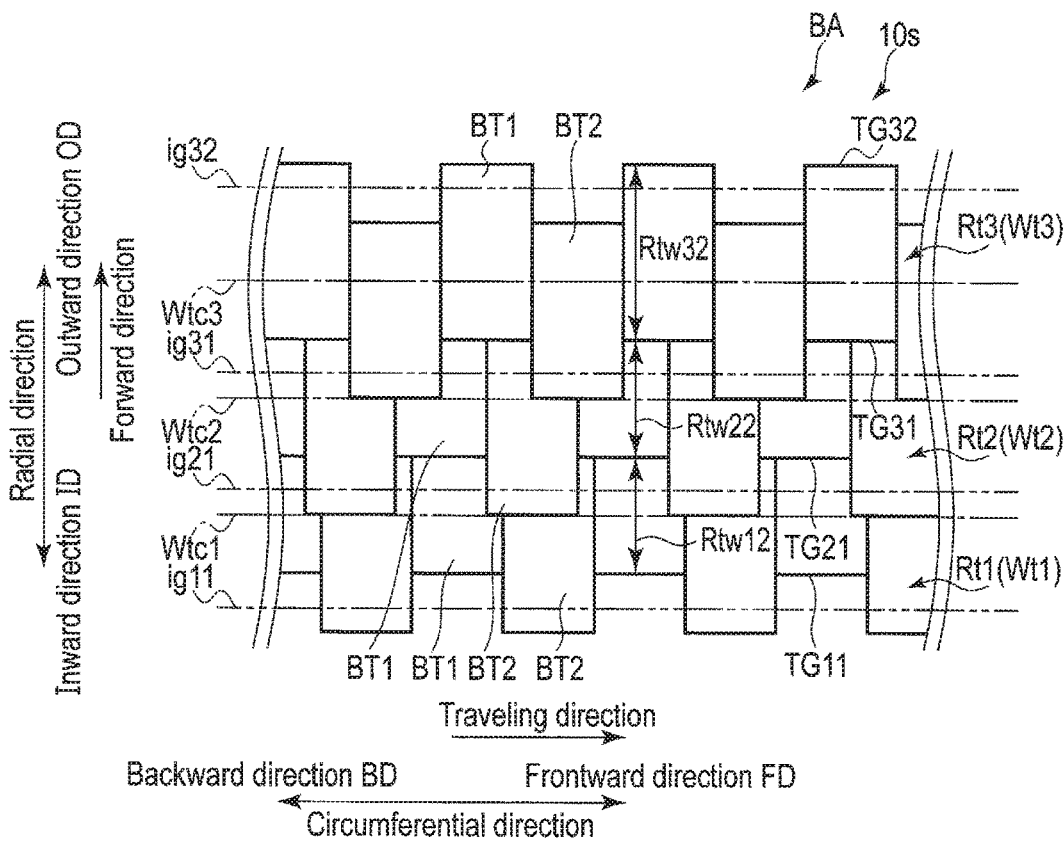
F I G. 8B

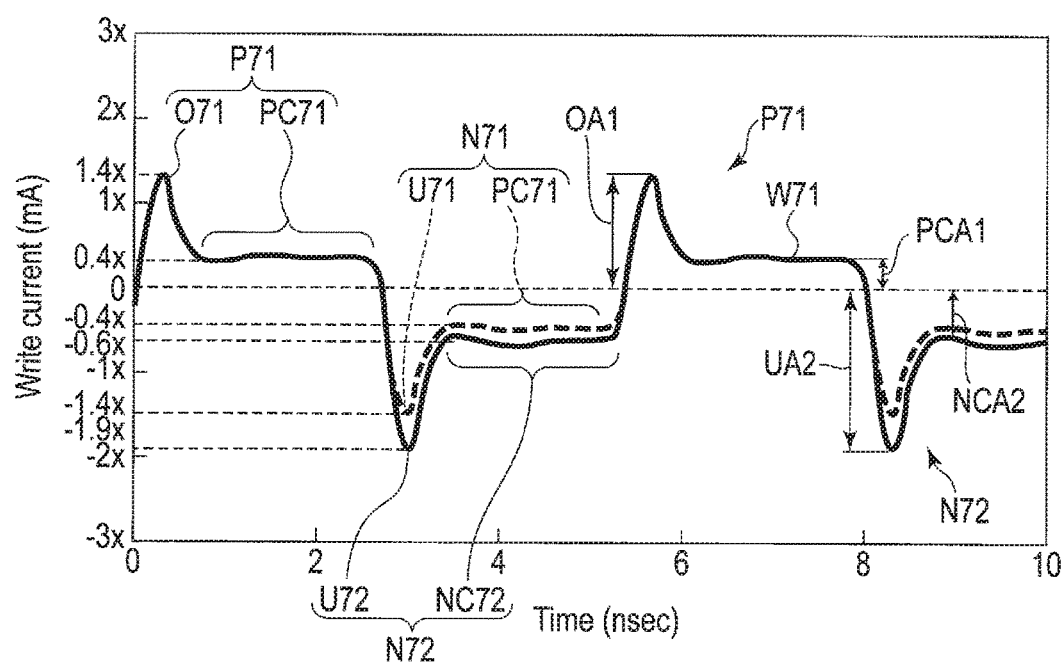
F I G. 14

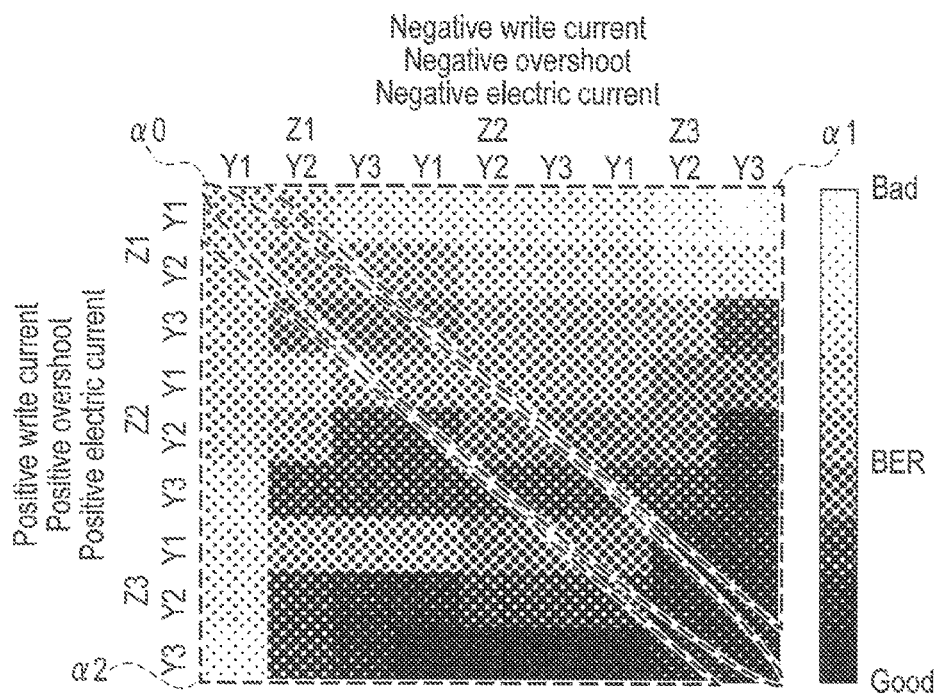
F I G. 16
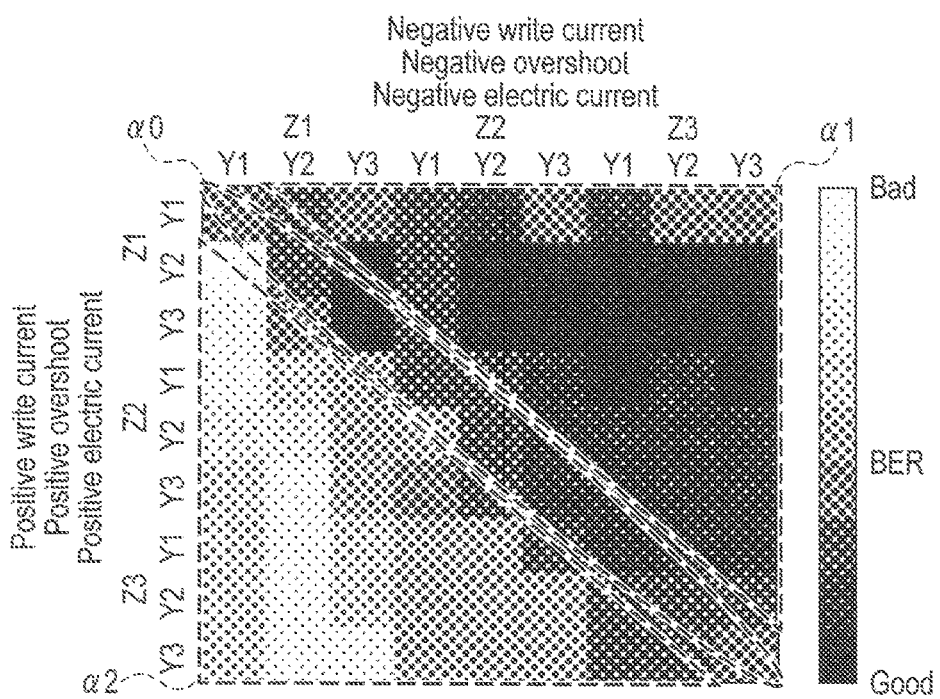
F I G. 17

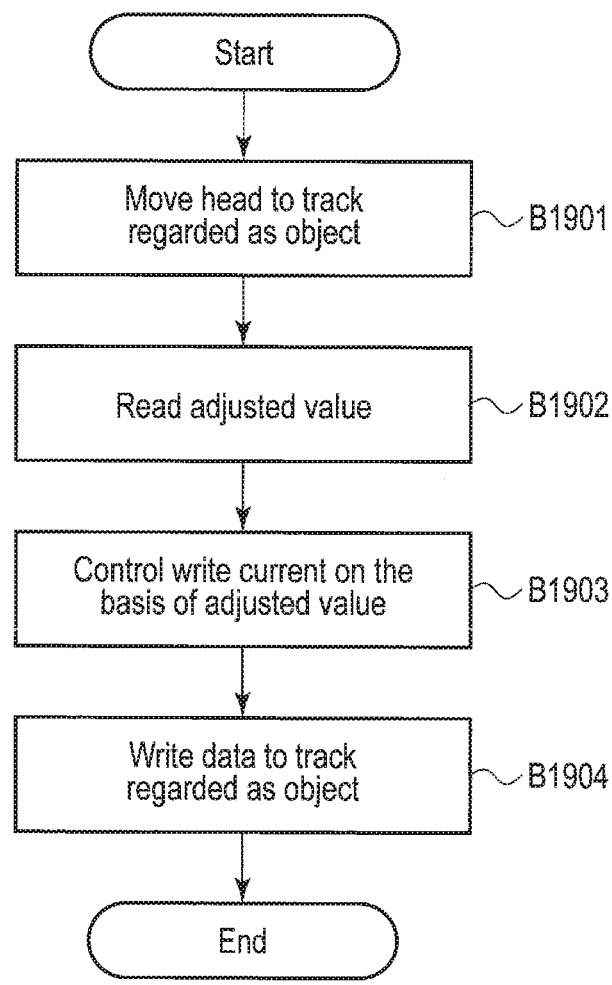
F I G. 19

MAGNETIC DISK DEVICE AND WRITE PROCESSING METHOD

CROSS-REFERENCE TO RELATED APPLICATIONS

This application is based upon and claims the benefit of priority from Japanese Patent Application No. 2017-038577, filed Mar. 1, 2017, the entire contents of which are incorporated herein by reference.

FIELD

Embodiments described herein relate generally to a magnetic disk device.

BACKGROUND

A magnetic disk device is provided with a write head including a main pole, write shield, and side shields. In the magnetic disk device, a recording current is applied to the write head, whereby a recording magnetic field is excited, and data is recorded onto a recording layer of the disk directly under the main pole of the write head. The side shields are formed integral with the write shield, and are positioned in the cross-track direction of the main pole. The side shields are magnetized in one direction in the cross-track direction. For this reason, in the write head, an easy direction of magnetization in which the magnetic flux of the recording magnetic field can easily flow, and a hard direction of magnetization in which the magnetic flux of the recording magnetic field can hardly flow exist in the cross-track direction.

BRIEF DESCRIPTION OF THE DRAWINGS

FIG. 1 is a block diagram showing the configuration of a magnetic disk device according to a first embodiment;

FIG. 5B is a cross-sectional view schematically showing an example of a tip end part of a main pole and side shields cut along line V-V of FIG. 3;

FIG. 8A is a schematic view showing an example of arrangement of recording bits written by a recording magnetic field on which a magnetic field in the magnetization direction of the side shields acts;

FIG. 8B is a schematic view showing an example of arrangement of recording bits written by a recording magnetic field on which a magnetic field in the magnetization direction of the side shields acts;

FIG. 14 is a view showing an example of a waveform of a recording current in which positive and negative amplitudes are different from each other according to this embodiment;

FIG. 16 is a view showing a relationship between the recording current and the bit error rate;

FIG. 17 is a view showing a relationship between the recording current and the bit error rate;

FIG. 19 is a flowchart showing an example of a data writing method according to this embodiment.

DETAILED DESCRIPTION

Figure 2:
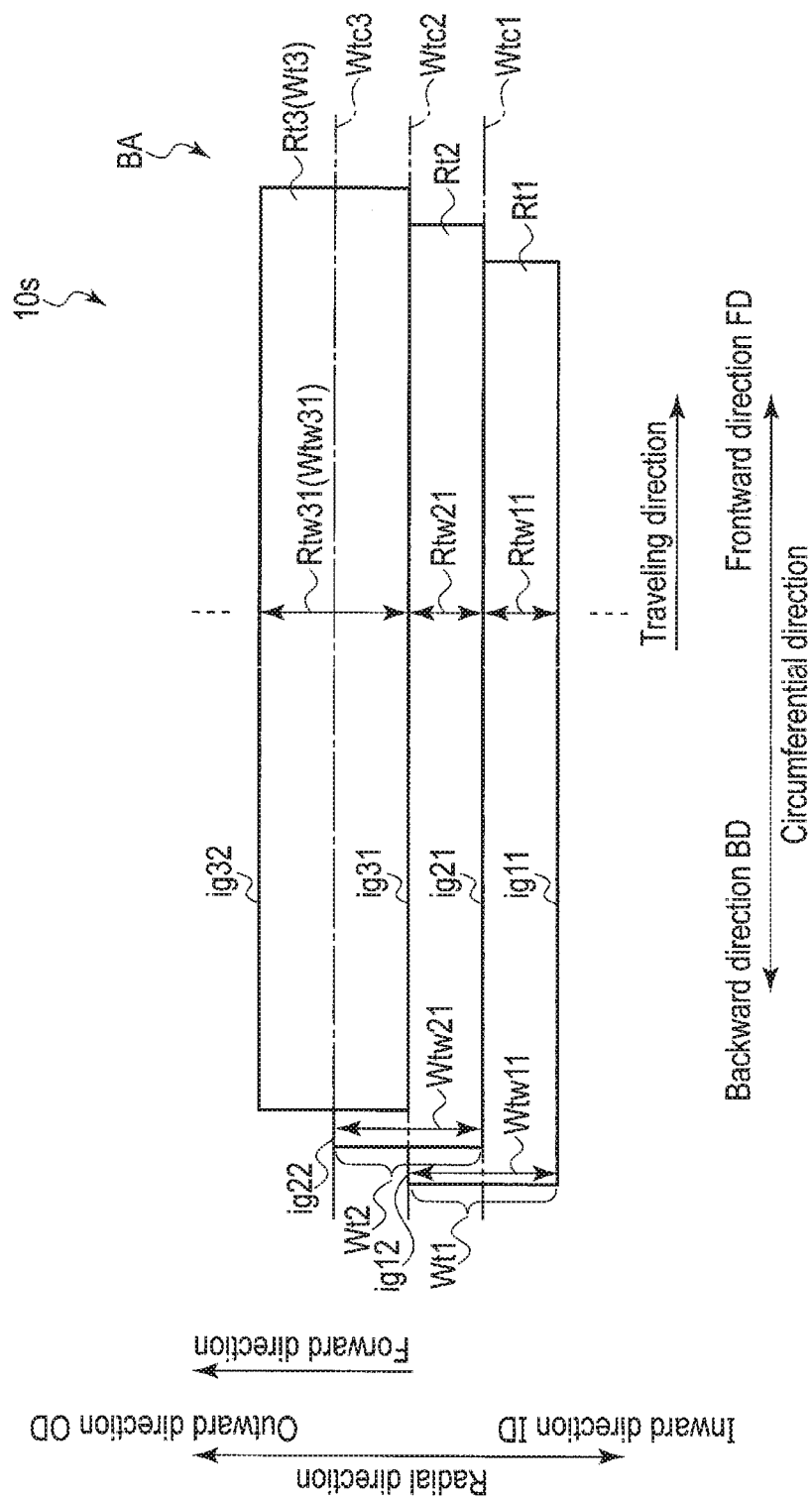
FIG. 2 is a schematic view showing an example of a shingled magnetic recording area to which data is written.

In general, according to one embodiment, a magnetic disk device comprises: a disk; a head including a main pole configured to apply a recording magnetic field to the disk, and side shields provided in a first direction with respect to the main pole and possessing a magnetic field in the magnetization direction of the first direction; and a controller configured to output a recording current in which a magnitude of a first electric current and a magnitude of a second electric current opposite to the first electric current in direction of the current are different from each other to the head according to the magnetic field of the side shields.

According to another embodiment, a magnetic disk device comprises: a disk; a head including a main pole configured to apply a recording magnetic field to the disk, and side shields provided in a first direction with respect to the main pole and possessing a magnetic field in the magnetization direction of the first direction; an integrated circuit configured to output a recording current in which a magnitude of a first electric current and a magnitude of a second electric current opposite to the first electric current in direction of the current are different from each other to the head according to the magnetic field of the side shields; and a controller configured to control the recording current.

According to another embodiment, a write processing method applied to a magnetic disk device including a disk and a head including a main pole configured to apply a recording magnetic field to the disk, and side shields provided in a first direction with respect to the main pole and possessing a magnetic field in the magnetization direction of the first direction; the method comprising: outputting a recording current in which a magnitude of a first electric current and a magnitude of a second electric current opposite to the first electric current in direction of the current are different from each other to the head according to the magnetic field of the side shields.

Hereinafter, an embodiment will be described with reference to the drawings. It should be noted that the drawings are only examples, and are not intended to limit the scope of the invention.

First Embodiment

FIG. 1 is a block diagram showing the configuration of a magnetic disk device 1 according to a first embodiment.

The magnetic disk device 1 is provided with a head-disk assembly (HDA) to be described later, driver IC 20, head amplifier integrated circuit (hereinafter referred to as a head amplifier IC) 30, volatile memory 70, nonvolatile memory 80, buffer memory (buffer) 90, and system controller 130 which is a one-chip integrated circuit. Further, the magnetic disk device 1 is connected to a host system (host) 100.

The HDA includes a magnetic disk (hereinafter referred to as a disk) 10, spindle motor (SPM) 12, arm 13 on which a head 15 is mounted, and voice coil motor (VCM) 14. The disk 10 is rotated by the spindle motor 12. The arm 13 and the VCM 14 constitute an actuator. The actuator controls movement of the head 15 mounted on the arm 13 to a target radial position on the disk 10 by the drive of the VCM 14. A plurality of disks 10 or heads 15 may be provided.

In the disk 10, a shingled magnetic recording (SMR) area 10s and media cache area 10m are assigned to areas in a data area. In the shingled magnetic recording area 10s, user data or the like requested by the host 100 to be written is recorded. The media cache area 10m can be utilized as a cache of the shingled magnetic recording area 10s. The shingled magnetic recording area 10s is a recording area in which part of a track is overwritten with a next written track (write track). In this way, a plurality of tracks are overwritten, whereby the number of tracks per inch (TPI) of the shingled magnetic recording area 10s becomes larger than the number of tracks per inch of an ordinary recording area in which overwriting is not carried out. In the shingled magnetic recording area 10s, a track group in which a plurality of tracks are overwritten is called a band area. The band area includes at least one track (shingled magnetic recording track) with which part of an adjacent track is overwritten, and a track (last track) for last overwriting. The last track is not overwritten with another track, and hence has a track width larger than the shingled magnetic recording track. The shingled magnetic recording area 10s can include a plurality of band areas. Hereinafter, a track of the head 15 at the time of data write is called a write track. Further, an area of the remaining write track excluding the overwritten area is called a read track. It should be noted that there are some cases where the term "track" is used as a term including "write track" and "read track". A track includes a plurality of recording bits.

FIG. 2 is a schematic view showing an example of a shingled magnetic recording area 10s to which data is written. In FIG. 2, let the horizontal axis be the circumferential direction of the disk 10 (hereinafter simply referred to as the circumferential direction), and the vertical axis the radial direction of the disk 10 perpendicular to the circumferential direction. The circumferential direction is a direction parallel to the rotational direction of the disk 10 (hereinafter simply referred to as the rotational direction). In the circumferential direction, let one direction be the frontward direction FD, and the direction opposite to the frontward direction the backward direction BD. Further, in the circumferential direction, the direction in which data is written is called the traveling direction. For example, the traveling direction is a direction opposite to the rotational direction. In FIG. 2, the traveling direction is a direction identical to the frontward direction FD. It should be noted that the traveling direction may be a direction identical to the backward direction BD. In the radial direction, it is assumed that the direction from the inner circumference of the disk 10 to the outer circumference is the outward direction OD, and the direction opposite to the outward direction OD is the inward direction ID. Further, in the radial direction, the direction in which data is written is called the forward direction. In FIG. 2, the forward direction is the direction identical to the outward direction. It should be noted that the forward direction may be the direction identical to the inward direction ID.

In FIG. 2, the band area BA written to the shingled magnetic recording area 10s is shown. In FIG. 2, although each track is indicated by a linear part having a certain track width and extending in the circumferential direction for convenience of explanation, the track is actually a curved part extending in the circumferential direction. Further, in FIG. 2, it is assumed that each track does not include displacement or the like caused by the influence of the disturbance and other structural factors or the like.

In FIG. 2, write tracks Wt1, Wt2, and Wt3 are shown. The write track Wt1 includes a track edge ig11 and a track edge ig12. In the example shown in FIG. 2, the track edge ig11 is an end part of the write track Wt1 in the direction (inward direction ID) opposite to the forward direction, and the track edge ig12 is an end part of the write track Wt1 in the forward direction (outward direction OD). The write track Wt2 includes a track edge ig21 and a track edge ig22. In the example shown in FIG. 2, the track edge 21 is an end part of the write track Wt2 in the direction (inward direction ID) opposite to the forward direction, and the track edge ig22 is an end part of the write track Wt2 in the forward direction (outward direction OD). The write track Wt3 includes a track edge ig31 and a track edge ig32. In the example shown in FIG. 2, the track edge 31 is an end part of the write track Wt3 in the direction (inward direction ID) opposite to the forward direction, and the track edge ig32 is an end part of the write track Wt3 in the forward direction (outward direction OD).

In FIG. 2, a track width (hereinafter simply referred to as the write track width) Wtw11 of the write track Wt1 is a width between the track edges ig11 and ig12 in the radial direction. A write track width Wtw21 is a width between the track edges ig21 and ig22 in the radial direction. A write track width Wtw31 is a width between the track edges ig31 and ig32 in the radial direction. Further, in FIG. 2, a track center Wtc1 of the write track Wt1, track center Wtc2 of the write track Wt2, and track center Wtc3 of the write track Wt3 are shown. The track centers wtc1, Wtc2, and Wtc3 are each positions of the tracks in the circumferential direction, and are orbits passing through the center positions of the write track widths Wtw11, Wtw21, and Wtw31. In the example, shown in FIG. 2, although the track centers Wtc1, Wtc2, and Wtc3 are indicated by straight lines in the circumferential direction, actually they are curved lines in the circumferential direction of the disk 10.

Further, in FIG. 2, read tracks Rt1, Rt2, and Rt3 are shown. The read track Rt1 corresponds to the write track Wt1, the read track Rt2 corresponds to the write track Wt2, and the read track Rt3 corresponds to the write track Wt3. In FIG. 2, a track width (hereinafter simply referred to as the read track width) Rtw11 of the read track Rt1 in the radial direction, read track width Rtw21 of the read track Rt2, and read track width Rtw31 of the read track Rt3 are shown. The read track width Rtw11 is a width from the track edge ig11 to the track edge ig21 in the radial direction. That is, the read track width Rtw11 is a track pitch between the read track Rt1 and the read track Rt2. The read track width Rtw21 is a width from the track edge ig21 to the track edge ig31 in the radial direction. That is, the read track width Rtw21 is a track pitch between the read track Rt2 and the read track Rt3. The read track width Rtw31 is a width from the track edge ig31 to the track edge ig32 in the radial direction. That is, the read track width Rtw31 is the write track width Wtw31. Hereinafter, the read tracks Rt1 and Rt2 are called shingled magnetic recording tracks, and the read track Rt3 is called a last track in some cases.

The band area BA includes the shingled magnetic recording tracks Rt1 and Rt2, and the last track Rt3. Although not shown, each of the shingled magnetic recording tracks Rt1 and Rt2, and the last track Rt3 is divided into a plurality of sectors.

The shingled magnetic recording tracks Rt1 is the remaining part of the write track Wt1 excluding the part thereof overwritten with the write track Wt2 adjacent to the write track Wt1 in the forward direction. The shingled magnetic recording tracks Rt2 is the remaining part of the write track Wt2 excluding the part thereof overwritten with the write track Wt3 adjacent to the write track Wt2 in the forward direction. The last track Rt3 is the write track Wt3 with which part of the write track Wt2 is overwritten. In FIG. 2, the track widths Rtw11 and Rtw21 of the shingled magnetic recording tracks Rt1 and Rt2 are approximately identical to each other. The track width Rtw31 of the last track Rt3 is greater than the track widths Rtw11 and Rtw21 of the shingled magnetic recording tracks Rt1 and Rt2. Further, although it has been described that the band area BA includes three tracks, the band area BA may include less than or more than three tracks.

As shown in FIG. 1, the driver IC 20 controls drive of the SPM 12 and VCM 14 in accordance with the control of the system controller 130 (more specifically, an MPU 60 to be described later). The head amplifier IC 30 is provided with a read amplifier 31 and write driver 33. The read amplifier 31 amplifies a read signal read from the disk 10, and outputs the amplified read signal to the system controller 130 (more specifically, a read/write (R/W) channel 40 to be described later). The write driver 33 outputs a recording current (write current) corresponding to write data output from the system controller 130 to the head 15. Further, the write driver 33 changes the magnitude of the recording current value according to a control signal from the system controller 130, for example, the MPU 60. It should be noted that the write driver 33 may include a power source configured to supply a recording current corresponding to the control signal from the system controller 130. Further, the head amplifier IC 30 may be provided with this power source separately from the write driver 33.

The head 15 is provided with a slider serving as a main body, and write head 15W and read head 15R mounted on the slider. The write head 15W writes data to the disk 10 according to the recording current output from the write driver 33. The read head 15R reads data written to the data track on the disk 10.

Figure 3:
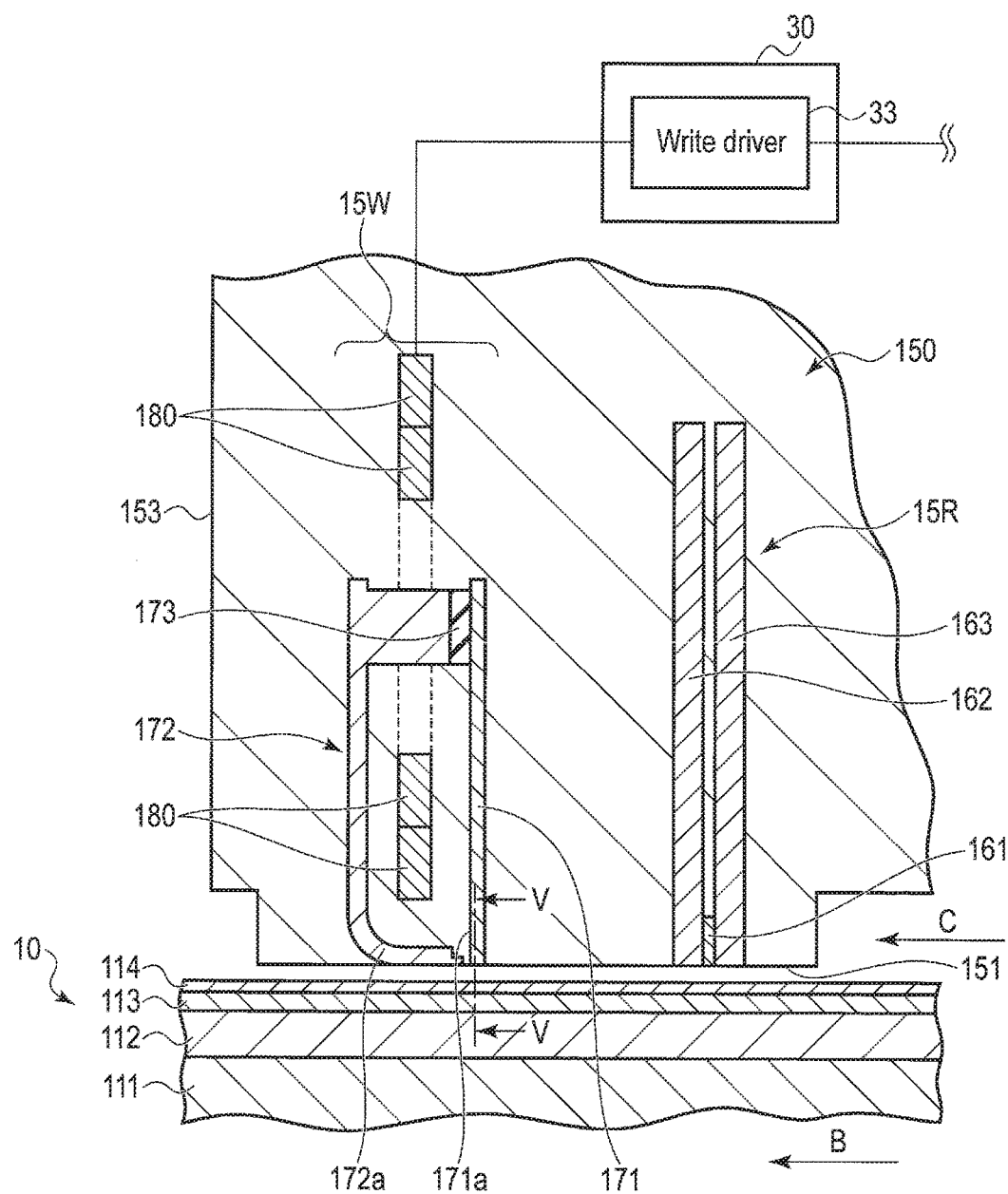
FIG. 3 is an enlarged cross-sectional view showing an example of a disk and a head.

FIG. 3 is an enlarged cross-sectional view showing an example of the disk 10 and the head 15. Hereinafter, a direction from the head 15 to the disk 10 is called a downward direction, and a direction from the disk 10 to the head 15 is called an upward direction. In FIG. 3, the rotational direction B of the disk 10 and the direction of the airflow C coincide with each other.

In the example shown in FIG. 3, in the disk 10, a substrate 111, soft magnetic layer 112, magnetic recording layer 113, and protection film layer 114 are stacked one on top of the other in sequence. The substrate 111 is formed of a discoid nonmagnetic material. The soft magnetic layer 112 is formed of a material exhibiting soft magnetic properties on the substrate 111. The magnetic recording layer 113 is on the soft magnetic layer 112, and has magnetic anisotropy in a direction perpendicular to the surface of the disk 10. The protection film layer 114 is formed on the magnetic recording layer 113.

In the example shown in FIG. 3, the head 15 is provided with a slider 150. The slider 150 is formed of, for example, a sintered body (AlTiC) of alumina and titanium carbide. The slider 150 has an air bearing surface (ABS) 151 opposed to the surface of the disk 10, and a trailing edge 153 positioned on the outflow side of the airflow C. Part of each of the read head 15R and the write head 15W is exposed at the air bearing surface 151.

The read head 15R is constituted of a magnetic film 161, shield film 162, and shield film 163. The magnetic film 161 is positioned between the shield film 162 and the shield film 163, and yields a magnetoresistive effect. The shield film 162 is positioned on the trailing edge 153 side of the magnetic film 161. The shield film 163 is opposed to the shield film 162. A lower end of each of the magnetic film 161, shield film 162, and shield film 163 is exposed at the air bearing surface 151.

The write head 15W is provided on the trailing edge 153 side of the slider 150 with respect to the read head 15R. The write head 15W is provided with a main pole 171, trailing shield (write shield) 172, and recording coil 180 arranged in such a manner that the coil 180 is wound around the magnetic circuit including the main pole 171 and the write shield 172 in order to make a magnetic flux flow through the main pole 171.

The main pole 171 is constituted of a soft magnetic material realizing high saturation magnetic flux density. The main pole 171 generates a recording magnetic field in a direction perpendicular to the surface of the disk 10 in order to magnetize the magnetic recording layer 113 of the disk 10. In the example shown in FIG. 3, the main pole 171 extends approximately perpendicular to the ABS 151. In the main pole 171, the ABS 151 side thereof is called a tip-end part 171a. An undersurface of the tip-end part 171a is exposed at the ABS 151. The tip-end part 171a of the main pole 171 is narrowed down toward the ABS 151 to thereby be formed into a columnar shape narrower than the other part. A width of the tip-end part 171a of the main pole 171 in the cross-track direction (track-width direction (first direction)) approximately corresponds to the track width of the write track. The cross-track direction is a direction perpendicular to the track. For example, the cross-track direction is a direction parallel to the radial direction of the disk 10.

The write shield 172 is constituted of a soft magnetic material realizing high saturation magnetic flux density. The write shield 172 is provided in order to efficiently form a closed magnetic path through the soft magnetic layer 112 directly under the main pole 171. The write shield 172 is positioned on the trailing edge 153 side of the main pole 171. The write shield 172 is coupled to the main pole 171 through an insulator 173. The main pole 171 and the write shield 172 are electrically insulated from each other, and form a magnetic circuit. The write shield is formed into an approximately L-shape, and includes a tip-end part 172a opposed to the tip-end part 171a of the main pole 171 with a write gap held between them. An undersurface of the tip-end part 172a is exposed at the ABS 151 of the slider 150.

The recording coil 180 is provided to be wound around the magnetic circuit including the main pole 171 and the write shield 172 in order to make a magnetic flux flow through the main pole 171. The recording coil 180 is provided between, for example, the main pole 171 and the write shield 172. The recording coil 180 is connected to the write driver 33. A recording current supplied from the write driver 33 to the recording coil 180 is controlled by the system controller 130, for example, the MPU 60. A current having a certain magnitude is supplied from the write driver 33 to the recording coil 180, whereby a recording magnetic field is excited in the main pole 171 and the write shield 172. Accordingly, the main pole 171 and the write shield are magnetized. The magnetization direction of recording bits of the magnetic recording layer 113 of the disk 10 is changed by the magnetic flux flowing through the magnetized main pole 171 and the write shield 172, whereby a magnetization pattern corresponding to the recording current is recorded on the disk 10. Hereinafter, "changing the magnetization direction of recording bits" is expressed as "writing recording bits" in some cases.

Figure 4:
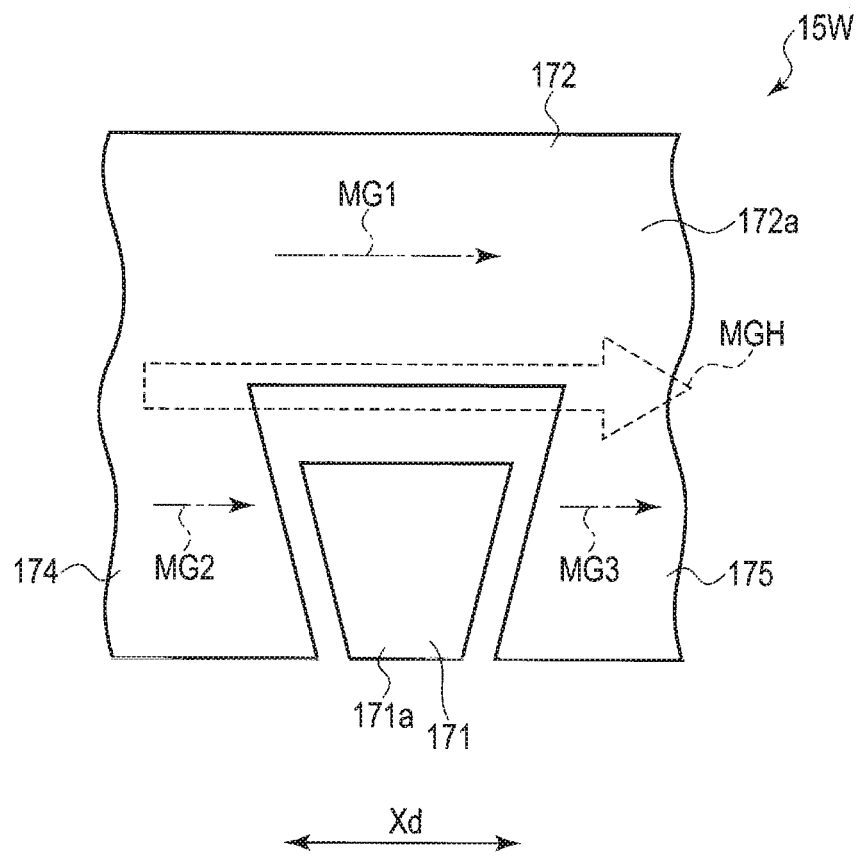
FIG. 4 is a plan view showing an example of an undersurface of a head observed from the air bearing surface side.

FIG. 4 is a plan view showing an example of an undersurface of the head 15 observed from the air bearing surface ABS 151 side. FIG. 4 shows an example of a magnetization direction of the write shield 172 and a side shield 175 of a case where data is not being written to the disk 10. In FIG. 4, the magnetization direction MG1 of the write shield 172, magnetization direction MG2 of a side shield 174, and magnetization direction MG3 of the side shield 175 of the case where data is not being written. Further, in FIG. 4, the cross-track direction Xd is shown.

The write head 15W is provided with the side shields 174 and 175 provided on both sides of the main pole 171 in the cross-track direction. The side shields 174 and 175 are constituted of a soft magnetic material realizing high saturation magnetic flux density, and are coupled to the write shield 172. In the example shown in FIG. 4, the side shields 174 and 175 are formed integral with the write shield 172. Further, the side shield 174 and the side shield 175 are opposed to each other in the cross-tack direction Xd with the main pole 171 interposed between the side shields 174 and 175. In other words, the side shield 174 and the side shield 175 are provided in the cross-track direction Xd with respect to the main pole 171. The write shield 172, and the side shields 174 and 175 are physically separated from the main pole 171.

In the write shield 172, and the side shields 174 and 175, the magnetization direction at the time when data is not being written are fixed (magnetized) in order that an unintended magnetic field may not be caused in the direction toward the disk 10. For example, the magnetization directions MG1, MG2, and MG3 of the write shield 172, side shield 174, and side shield 175 are fixed in a direction parallel to the surface of the disk 10, for example, the cross-track direction Xd. In the example shown in FIG. 4, the magnetization directions MG1, MG2, and MG3 are directions from the side shield 174 to the side shield 175 in the cross-tack direction Xd. The write shield 172 and the side shields 174 and 175 behave as if they were a one magnet. For that reason, hereinafter, the magnetization directions MG1, MG2, and MG3 of the write shield 172, side shield 174, and side shield 175 are collectively called the magnetization direction MGH.

Figure 5A:
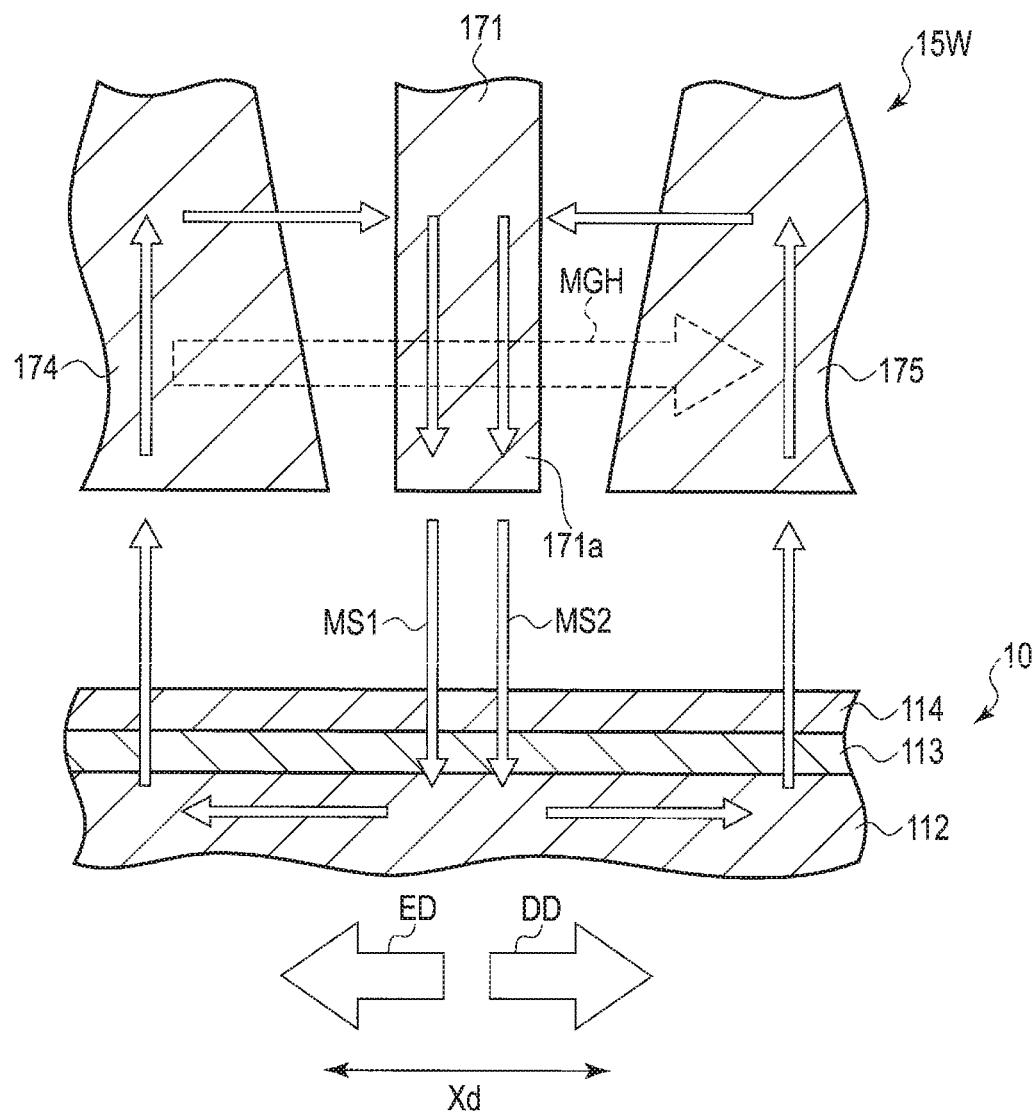
FIG. 5A is a cross-sectional view schematically showing an example of a tip end part of a main pole and side shields cut along line V-V of FIG. 3.

Each of FIG. 5A and FIG. 5B is a cross-sectional view schematically showing an example of the tip end part 171a of the main pole 171 and the side shields 174 and 175 cut along line V-V of FIG. 3. Each of FIG. 5A and FIG. 5B schematically shows an example of a flow of a magnetic flux in the cross-track direction Xd in the main pole 171 and the side shields 174 and 175 of the case where data is being written to the disk 10. FIG. 5A and FIG. 5B show the states where the magnetic polarities of the recording magnetic fields generated at the write heads 15W are opposite to each other. That is, in FIG. 5A and FIG. 5B, the magnetic fluxes of the recording magnetic fields generated at the write heads 15W flow in the directions opposite to each other. Further, in FIG. 5A and FIG. 5B, the magnetization directions MGH of the side shields 174 and 175 are identical to each other. It should be noted that for convenience of explanation, in FIG. 5A, although only two flows MS1 and MS2 of magnetic fluxes are shown, many other flows of magnetic fluxes are produced. Likewise, in FIG. 5B, although only two flows MN1 and Mn2 of magnetic fluxes are shown, many other flows of magnetic fluxes are produced. Further, hereinafter, "a flow of a magnetic flux" is simply expressed as "a magnetic flux" in some cases.

The direction (polarity) in which a magnetic flux of the recording magnetic field of the main pole 171 flows is reversed according to a change (positive/negative change or polarity reversal) in direction of the recording current to be applied to the recording coil 180.

FIG. 5A is a view schematically showing an example of flows MS1 and MS2 of magnetic fluxes of the recording magnetic field in the cross-track direction Xd. In the example shown in FIG. 5A, the flow MS1 of the magnetic flux of the recording magnetic field goes from the main pole 171 toward the disk 10, passes through the soft magnetic layer 112 of the disk 10 and goes toward the side shield 174, passes through the side shield 174, and returns to the main pole 171. Likewise, the flow MS2 of the magnetic flux of the recording magnetic field goes from the main pole 171 toward the disk 10, passes through the soft magnetic layer 112 of the disk 10 and goes toward the side shield 175, passes through the side shield 175, and returns to the main pole 171. In this case, the magnetization direction MGH of the side shields 174 and 175 is the direction from the side shield 174 toward the side shield 175 in the cross-track direction Xd. The flow MS1 of the magnetic flux flows in the direction identical to the magnetization direction MGH. Accordingly, the flow MS1 of the magnetic flux can easily flow by the effect of the magnetic field in the magnetization direction MGH. On the other hand, the flow MS2 of the magnetic flux flows in the direction opposite to the magnetization direction MGH. Accordingly, the flow MS2 of the magnetic flux cannot flow easily by the effect of the magnetic field in the magnetization direction MGH.

FIG. 5B is a view schematically showing an example of flows MN1 and MN2 of magnetic fluxes of the recording magnetic field in the cross-track direction Xd opposite to FIG. 5A. In the example shown in FIG. 5B, the flow MN1 of the magnetic flux of the recording magnetic field goes from the main pole 171 toward the side shield 174, goes from the side shield 174 toward the disk 10, passes through the soft magnetic layer 112 of the disk 10, and returns to the main pole 171. Likewise, the flow MN2 of the magnetic flux of the recording magnetic field goes from the main pole 171 toward the side shield 175, goes from the side shield 175 toward the disk 10, passes through the soft magnetic layer 112 of the disk 10, and returns to the main pole 171. In this case, the magnetization direction MGH of the side shields 174 and 175 is the direction from the side shield 174 toward the side shield 175 in the cross-track direction Xd. The flow MN1 of the magnetic flux flows in the direction opposite to the magnetization direction MGH. Accordingly, the flow MN1 of the magnetic flux cannot easily flow by the effect of the magnetic field in the magnetization direction MGH. On the other hand, the flow MN2 of the magnetic flux flows in the direction identical to the magnetization direction MGH. Accordingly, the flow MN2 of the magnetic flux can easily flow by the effect of the magnetic field in the magnetization direction MGH.

As shown in FIG. 5A and FIG. 5B, the magnetic field in the magnetization direction MGH in the side shields 174 and 175 acts on the recording magnetic field, whereby an easy direction of magnetization ED in which the magnetic flux of the recording magnetic field can easily flow, and a hard direction of magnetization DD in which the magnetic flux of the recording magnetic field cannot easily flow can be created. When the magnetic field in the magnetization direction MGH acts on the recording magnetic field as described above, there is a possibility of the write head 15W writing recording bits to a position deviated from the target position of a certain track in the easy direction of magnetization. That is, when the magnetic field in the magnetization direction MGH acts on the recording magnetic field, the write head 15W writes data to a position shifted from the target position of a certain track in the easy direction of magnetization. The easy direction of magnetization ED and the hard direction of magnetization DD are determined on the basis of the direction in which the magnetic flux of the recording magnetic field flows, and the magnetization direction MGH of the magnetic field in the side shields 174 and 175. In the examples shown in FIG. 5A and FIG. 5B, although the magnetization directions MGH of the side shields 174 and 175 are identical to each other, the flows of the magnetic fluxes are in the directions opposite to each other, and hence the easy directions of magnetization ED and the hard directions of magnetization DD are respectively opposite to each other.

In FIG. 1, the volatile memory 70 is a semiconductor memory in which stored data is lost when electric power supply is cut off. The volatile memory stores therein data and the like necessary for processing at each part of the magnetic disk device 1. The volatile memory 70 is, for example, a dynamic random access memory (DRAM) or a synchronous dynamic random access memory (SDRAM).

The nonvolatile memory 80 is a semiconductor memory in which stored data is recorded even when power supply is cut off. The nonvolatile memory 80 is, for example, a NOR-type or a NAND-type flash read only memory (FROM).

The buffer memory 90 is a semiconductor memory configured to temporarily record thereon data and the like to be transmitted/received to/from the magnetic disk device 1 from/by the host 100. It should be noted that the buffer memory 90 may be formed integral with the volatile memory 70. The buffer memory 90 is, for example, a dynamic random access memory (DRAM), static random access memory (SRAM), SDRAM, ferroelectric random access memory (FeRAM), magnetoresistive random access memory (MRAM) or the like.

The system controller (controller) 130 is realized by using a large-scale integrated circuit (LSI) called a System-on-a-Chip (SoC) in which a plurality of elements are integrated into a single chip. The system controller 130 includes a read/write (R/W) channel 40, hard disk controller (HDC) 50, and microprocessor (MPU) 60.

The R/W channel 40 executes signal processing of read data and write data. The R/W channel 40 includes a circuit or a function configured to measure the signal quality of read data. The HDC 50 controls data transfer between the host 100 and the R/W channel 40 according to an instruction from the MPU 60 to be described later.

The MPU 60 is a main controller configured to control each part of the magnetic disk device 1. The MPU 60 controls the VCM 14 through the driver IC 20, and executes servo control for carrying out positioning of the head 15. Further, the MPU 60 controls an operation of writing data to the disk 10, and selects a saving destination of write data transferred thereto from the host 100.

The MPU 60 includes a read/write control section 61, recording current control section 63, and adjusting section 65. The MPU 60 may execute processing of these sections on the firmware.

The read/write control section 61 controls read processing and write processing of data in accordance with a command from the host 100. The read/write control section 61 controls the VCM 14 through the driver IC 20, positions the head 15 to the target position on the disk 10, and executes read processing or write processing. When, for example, executing write processing, the read/write control section 61 executes shingled magnetic recording by using a track center of each track as a target position.

Figure 6:
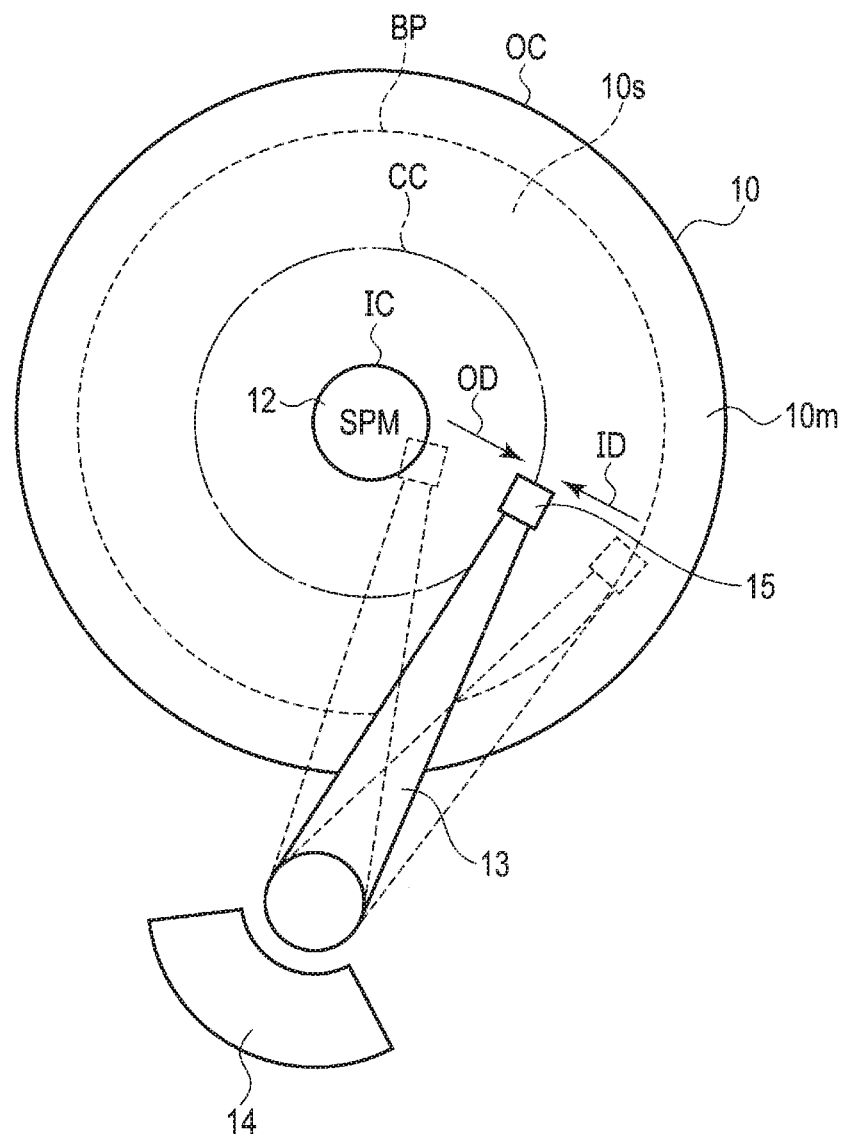
FIG. 6 is a schematic view showing an example of data write processing control.

FIG. 6 is a schematic view showing an example of data write processing control. In FIG. 6, an inner circumference IC of the disk 10 in the radial direction, changeover position CC, boundary position BP between the media cache area 10m and the shingled magnetic recording area 10s, and outer circumference OC of the disk 10 in the radial direction are shown. Further, in FIG. 6, the outward direction OD from the inner circumference IC to the outer circumference, and the inward direction ID from the outer circumference OC to the inner circumference IC are shown. The changeover position CC is a position at which the direction (forward direction) in which data is written is switched in the radial direction. The changeover position CC is positioned between the inner circumference IC and the boundary position BP. For example, the changeover position CC is a position at which the skew angle that is the inclination of the disk 10 from the circumferential direction becomes approximately zero. It should be noted that the changeover position CC may be set to a different position for each head or magnetic disk device.

The read/write control section 61 changes the forward direction to the outward direction OD or to the inward direction ID to thereby write data. As an example, the read/write control section 61 records data by shingled magnetic recording from the inner circumference IC to the changeover position CC in the outward direction OD and, thereafter records data by shingled magnetic recording from the boundary position BP to the changeover position CC in the inward direction ID. Further, the read/write control section 61 may record data by shingled magnetic recording from the boundary position BP to the changeover position CC in the inward direction ID and, thereafter record data by shingled magnetic recording from the inner circumference IC to the changeover position CC in the outward direction OD. In this way, the read/write control section 61 changes the forward direction to the outward direction OD or to the inward direction ID at the changeover position CC to carry out shingled magnetic recording, whereby it is possible for the read/write control section 61 to prevent a difference between the skew angle occurring in a track in the vicinity of the inner circumference IC of the disk 10 and that occurring in a tack in the vicinity of the outer circumference OC from adversely affecting the track width or the like. It should be noted that although it has been described that the read/write control section 61 changes the forward direction to the outward direction OD or to the inward direction ID at the changeover position CC, the read/write control section 61 may not change the forward direction. For example, the read/write control section 61 may fix the forward direction at one of the inward direction ID and the outward direction OD to thereby record data by shingled magnetic recording. It should be noted that the read/write control section 61 may execute normal write processing which is not the shingled magnetic recording.

The recording current control section 63 controls a recording current output from the head amplifier IC 30 (more specifically, the write driver 33) to the write head 15W, and makes the write head 15W generate a recording magnetic field corresponding to the recording current. That is, the recording current control section 63 writes data corresponding to the recording current to the disk 10 through the write head 15W. For example, the recording current control section 63 controls the recording current on the basis of an adjusted value. The adjusted value includes, for example, information concerning the radial position of the disk 10 and the recording current adjusted for each track. It should be noted that the adjusted value may differ from head to head or from magnetic disk device to magnetic disk device. The adjusted value is held in a memory, for example, in at least one of the volatile memory 70, nonvolatile memory 80, and buffer memory 90. Further, the adjusted value may be recorded in an internal memory (not shown) inside the MPU 60. The adjusted value is acquired by the adjustment processing or the like of the recording current to be described later. It should be noted that the recording current control section 63 may be provided in the head amplifier IC 30, may be provided in a part other than the MPU 60 of the system controller 130, or may be provided between the head amplifier IC 30 and the system controller 130.

The recording current control section 63 outputs a recording current having a magnitude (amplitude or absolute value) differing according to the direction of the current (positive/negative polarity or high/low value) to the write head 15W on the basis of the adjusted value, and makes the write head 15W generate a recording magnetic field having a magnitude differing according to the direction of the magnetic field (magnetic flux). Further, the recording current control section 63 can also output a recording current of a fixed magnitude irrespective of the direction of the current to the write head 15W, and make the write head 15W generate a recording magnetic field of a fixed magnitude irrespective of the direction of the magnetic field (magnetic flux).

Figure 7:
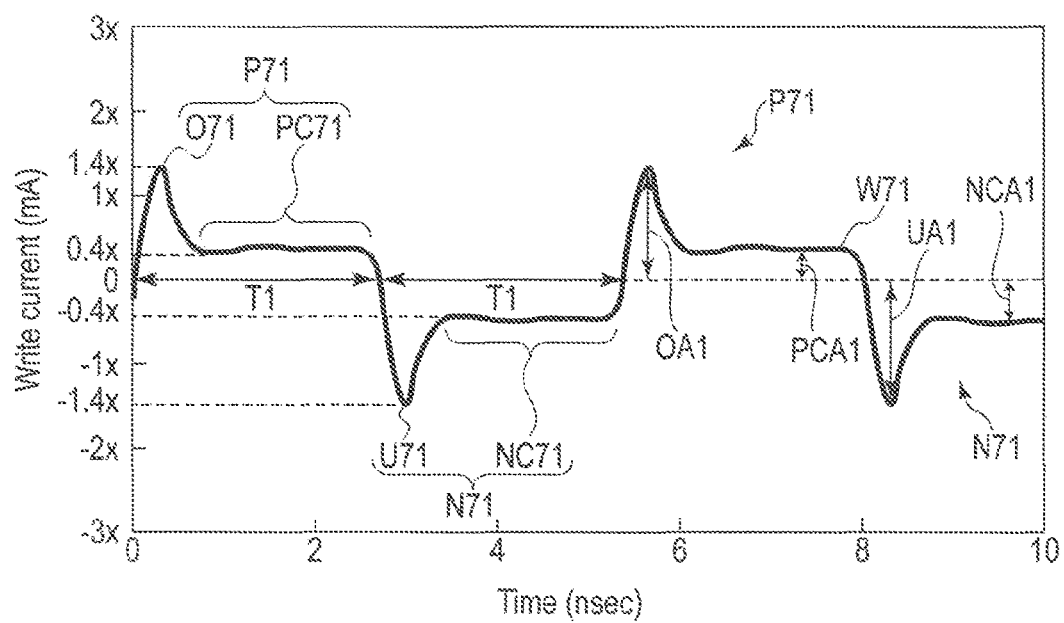
FIG. 7 is a view showing an example of a waveform of a recording current in which positive and negative amplitudes are identical to each other.

FIG. 7 is a view showing an example of a waveform of a recording current in which positive and negative amplitudes are identical to each other. In the example shown in FIG. 7, the vertical axis indicates a recording current [milliampere (mA)], and the horizontal axis indicates time [nanosecond (nsec)]. In FIG. 7, a waveform W71 of the recording current is shown. The waveform 71 changes in polarity (positive/negative) according to the time. In the example shown in FIG. 7, in the waveform 71, the waveform (or waveform of a high recording current) P71 of the positive recording current, and the waveform (or waveform of a low recording current) N71 of the negative recording current are periodically repeated. The period of each of the waveforms P71 and the waveform N71 is the identical period T1. The waveform P71 includes an overshoot O71 and a positive current PC71. In FIG. 7, an amplitude OA1 of the overshoot O71, and an amplitude PCA1 of the positive current PC71 are shown. The amplitude (first amplitude) OA1 is greater than the amplitude (second amplitude) PCA1. The waveform N71 includes an undershoot U71 and a negative current NC71. In FIG. 7, an amplitude UA1 of the undershoot U71, and an amplitude NCA1 of the negative current NC71 are shown. The amplitude (third amplitude) UA1 is greater than the amplitude (fourth amplitude) NCA1. The waveform P71 and the waveform N71 are symmetric with respect to a certain recording current, for example, a recording current of 0 [mA]. When the above state is expressed in terms of an asymmetry factor, the following expressions are obtained.

$$(OA1-UA1)/(OA1+UA1)=0, (PCA1-NCA1)/(PCA1+NCA1)=0$$

That is, the waveform P71 and the waveform N71 are identical to each other in amplitude. In the example shown in FIG. 7, each of the amplitude OA1 of the overshoot O71 and the amplitude UA1 of the undershoot U71 is about 1.4× [mA]. Further, each of the amplitude PCA1 of the current PC71 and the amplitude NCA1 of the current NC71 is about 0.4× [mA]. It should be noted that in FIG. 7, although it has been described that in the waveform W71, the waveform P71 and the waveform N71 are periodically repeated, the waveforms P71 and N71 may not be periodically repeated.

For example, the recording current control section 63 outputs the recording current of the waveform W71 shown in FIG. 7 to the write head 15W, and makes the write head 15W generate a recording magnetic field of a fixed magnitude irrespective of the direction of the magnetic flux. The recording current control section 63 outputs a positive recording current, for example, the positive recording current of the waveform P71 to the write head 15W, and makes the write head 15W generate the recording magnetic field of the magnetic flux flows MN1 and MN2 shown in FIG. 5B. The recording current control section 63 outputs a negative recording current, for example, the negative recording current of the waveform N71 to the write head 15W, and makes the write head 15W generate the recording magnetic field of the magnetic flux flows MS1 and MS2 shown in FIG. 5A. In this case, each of the recording magnetic field of the magnetic flux flows MN1 and MN2, and the recording magnetic field of the magnetic flux flows MS1 and MS2 has the identical magnitude. The recording current control section 63 writes data corresponding to the recording current at the target position of the disk 10 through the write head 15W. At this time, the magnetic field of the side shields 174 and 175 in the magnetization direction MGH acts on the recording magnetic field, and hence the write head 15W writes data to a position shifted from the target position in the easy direction of magnetization. It should be noted that the recording current control section 63 may output a positive recording current to the write head 15W, and make the write head 15W generate a recording magnetic field of the magnetic flux flows MS1 and MS2 shown in FIG. 5A. The recording current control section 63 may output a negative recording current to the write head 15W, and make the write head 15W generate a recording magnetic field of the magnetic flux flows MN1 and MN2 shown in FIG. 5B.

Each of FIG. 8A and FIG. 8B is a schematic view showing an example of arrangement of recording bits written by a recording magnetic field on which a magnetic field in the magnetization direction MGH of the side shields 174 and 175 acts. In FIG. 8A and FIG. 8B, the forward direction is a direction identical to the outward direction OD.

FIG. 8A is a schematic view showing an example of arrangement of recording bits on the write track Wt1 written by a recording magnetic field on which the magnetic field in the magnetization direction MGH acts.

In FIG. 8A, the track edge ig11 and the track edge ig12 of the write track Wt1 shown in FIG. 2 are shown. Further, in FIG. 8A, the write track width Wtw11 of the write track Wt1 shown in FIG. 2 is also shown. It is assumed that the write track Wt1 shown in FIG. 2 is written by a recording magnetic field on which no magnetic field in the magnetization direction MGH acts or by a recording magnetic field on which the magnetic field in the magnetization direction MGH acts to such a degree that the recording magnetic field is not influenced by the magnetic field. It is assumed for convenience of explanation that the track edge ig11 and the track edge ig12 are not varied. It should be noted that actually the track edges ig11 and ig12 are varied by the influence of the disturbance or the like in some cases.

In FIG. 8A, the write track Wt1 includes a track edge TG11 and a track edge TG12. In the example shown in FIG. 8A, the track edge TG11 is an end part of the write track Wt1 in the direction (inward direction ID) opposite to the forward direction, and the track edge TG12 is an end part of the write track Wt1 in the forward direction (outward direction OD). Further, the write track Wt1 includes recording bits BT1 and recording bits BT2. In the write track Wt1, the recording bits BT1 and the recording bits BT2 are alternately arranged in the circumferential direction. It should be noted that the recording bits BT1 and the recording bits BT2 may not be alternately arranged. For example, a plurality of recording bits BT1 may be consecutively arranged in a certain number in the circumferential direction. A plurality of recording bits BT2 may be consecutively arranged in a certain number in the circumferential direction. Further, a description identical to the description of the write track Wt1 applies to write tracks other than the write track Wt1, and hence a detailed description of the arrangement of the recording bits in other write tracks is omitted.

In the example shown in FIG. 8A, the recording bits BT1 and BT2 are rectangular. It should be noted that the recording bits BT1 and BT2 may have other shapes. The recording bit BT1 has an end part be11 in the direction (inward direction ID) opposite to the forward direction, and an end part be12 in the forward direction (outward direction OD) of the recording bit BT1. Further, the recording bit BT2 has an end part be21 in the direction (inward direction ID) opposite to the forward direction, and an end part be22 in the forward direction (outward direction OD). The width Btw11 of the recording bit BT1 in the radial direction is a width between the end part be11 and the end part be12 in the radial direction. The width Btw12 of the recording bit BT2 in the radial direction is a width between the end part be21 and the end part be22 in the radial direction. In FIG. 8A, the width Btw11 and the width Btw12 are identical to each other. Further, the width of the recording bit BT1 in the circumferential direction and the width of the recording bit BT2 in the circumferential direction are identical to each other. It should be noted that the width of the recording bit BT1 in the circumferential direction and the width of the recording bit BT2 in the circumferential direction may be different from each other.

In FIG. 8A, the recording bit BT1 is shifted in the easy direction of magnetization, for example, in the forward direction (outward direction OD) with respect to the track center Wtc1. The end part be11 and the end part be12 of the recording bit BT1 are shifted from the track edge ig11 and the track edge ig12, respectively in the easy direction of magnetization, for example, in the forward direction (outward direction OD).

In the example shown in FIG. 8A, the recording bit BT2 is shifted in the easy direction of magnetization, for example, in the direction opposite to the forward direction (inward direction ID) with respect to the track center Wtc1. The end part be21 and the end part be22 of the recording bit BT2 are shifted from the track edge ig11 and the track edge ig12, respectively in the easy direction of magnetization, for example, in the direction opposite to the forward direction (inward direction ID).

In FIG. 8A, the recording bit BT1 and the recording bit BT2 are shifted from each other in the radial direction. The end part be11 of the recording bit BT1 is shifted in the forward direction (outward direction OD) with respect to the recording bit BT2. The end part be12 of the recording bit BT1 is shifted in the forward direction (outward direction OD) with respect to the recording bit BT2. In FIG. 8A, a difference D1 between the end part be11 and the end part be21 in the radial direction is substantially identical to a difference D2 between the end part be12 and the end part be22 in the radial direction.

The end part be11 and the end part be21 correspond to the track edge TG11. The end part be12 and the end part be22 correspond to the track edge TG12. In FIG. 8A, the track edge TG11 and the track edge TG12 unevenly vary in the radial direction along a line in the circumferential direction. For example, the track edge TG11 unevenly varies along the line following the track edge ig11. Further, the track edge TG12 unevenly varies along the line following the track edge ig12. In FIG. 8A, the write track width Wtw12 of the write track Wt1 is shown. The write track width Wtw12 is a width between the track edge TG11 and the track edge TG12 in the radial direction. The write track width Wtw12 varies in the radial direction along a line in the circumferential direction.

In the example shown in FIG. 8A, for example, the read/write control section 61 positions the write head 15W to a track in the vicinity of the changeover position CC shown in FIG. 6.

The recording current control section 63 writes the recording bit BT1 by the recording magnetic field of the magnetic flux flows MN1 and MN2 shown in FIG. 5B through the write head 15W on the basis of a positive recording current, for example, the positive recording current of the waveform P71. The magnetic field in the magnetization direction MGH acts on the recording magnetic field, and hence the recording current control section 63 writes the recording bit BT1 at a position shifted in the easy direction of magnetization, for example, in the forward direction (outward direction OD) with respect to the track center Wtc1 as shown in FIG. 8A.

The recording current control section 63 writes the recording bit BT2 by the recording magnetic field of the magnetic flux flows MS1 and MS2 shown in FIG. 5A through the write head 15W on the basis of a negative recording current, for example, the negative recording current of the waveform N71. The magnetization direction in the magnetization direction MGH acts on the recording magnetic field, and hence the recording current control section 63 writes the recording bit BT2 at a position shifted in the easy direction of magnetization, for example, in the direction (inward direction ID) opposite to the forward direction with respect to the track center Wtc1 as shown in FIG. 8A.

Accordingly, the recording current control section 63 can create a write track Wt1 of a write track width Wtw12 unevenly varying in the radial direction along a line in the circumferential direction.

FIG. 8B is a schematic view showing an example of a band area BA recorded by shingled magnetic recording by the recording magnetic field on which the magnetic field in the magnetization direction MGH of the side shields 174 and 175 acts.

In FIG. 8B, the track edge ig11 of the write track Wt1, the track edge ig21 of the write track Wt2, and the track edge ig31 and the track edge ig32 of the write track Wt3 all of which are shown in FIG. 2 are shown. It is assumed that the write tracks Wt1, Wt2, and Wt3 shown in FIG. 2 are written by a recording magnetic field on which the magnetic field in the magnetization direction MGH does not act or acts to such a degree that the recording magnetic field is not influenced by the magnetic field. Although it is assumed for convenience of explanation that the track edges ig11, ig21, ig31, and ig32 are not varied, actually the track edges are varied by the influence of the disturbance or the like in some cases.

FIG. 8B shows a band area BA including the read tracks Rt1, Rt2, and Rt3. The band area BA is formed in such a manner that the write track Wt1 shown in FIG. 8A is written, then the write track Wt1 is overwritten with the write track Wt2, and the write track Wt2 is overwritten with the write track Wt3.

Each of the read tracks Rt1, Rt2, and Rt3 includes recording bits BT1 and recording bits BT2. In each of the read tracks Rt1, Rt2, and Rt3, the recording bits BT1 and the recording bits BT2 are alternately arranged in the circumferential direction.

In FIG. 8B, the track edge TG11, track edge TG21 of the read track Rt2 in the direction opposite to the forward direction, track edge TG31 of the read track Rt3 in the direction (inward direction ID) opposite to the forward direction, and track edge TG32 of the read track Rt3 in the forward direction (outward direction OD) are shown. Track edges TG11, TG21, TG31, and TG32 are each unevenly varied in the radial direction along a line in the circumferential direction. For example, the track edge TG11 is unevenly varied along the line following the track edge ig11. The track edge TG21 is unevenly varied along the line following the track edge ig21. The track edge TG31 is unevenly varied along the line following the track edge ig31. The track edge TG32 is unevenly varied along the line following the track edge ig32.

In FIG. 8B, the read track width Rtw12 of the read track Rt1, read track width Rtw22 of the read track Rt2, and read track width Rtw32 of the read track Rt3 are shown. The read track width Rtw12 is a width between the track edge TG11 and the track edge TG21 in the radial direction. The read track width Rtw22 is a width between the track edge TG21 and the track edge TG31 in the radial direction. The read track width Rtw32 is a width between the track edge TG31 and the track edge TG32 in the radial direction. For this reason, each of the read track widths Rtw12, Rtw22, and Rtw32 varies in the radial direction along a line in the circumferential direction. For example, each of the maximum values of the read track widths Rtw12 and Rtw22 is greater than the read tracks Rtw11 and Rtw21.

In the example shown in FIG. 8B, for example, the read/write control section 61 positions the write head 15W to a track in the vicinity of the changeover position CC shown in FIG. 6 to thereby record data by shingled magnetic recording. The recording current control section 63 outputs a recording current of the waveform W71 shown in FIG. 7 to the write head 15W to thereby record the read tracks Rt1, Rt2, and Rt3 on the band area BA by shingled magnetic recording as shown in FIG. 8B. In this case, as shown in FIG. 8B, the read track widths Rtw12, Rtw22, and Rtw32 are each varied in the radial direction along a line in the circumferential direction. In this embodiment, in order to prevent the read track width from being varied, the recording current control section 63 outputs a recording current having positive and negative amplitudes different from each other to the write head 15W on the basis of the adjusted value to thereby make the write head 15W generate a recording magnetic field having magnitudes different from each other according to the directions of the magnetic flux.

Figure 9:
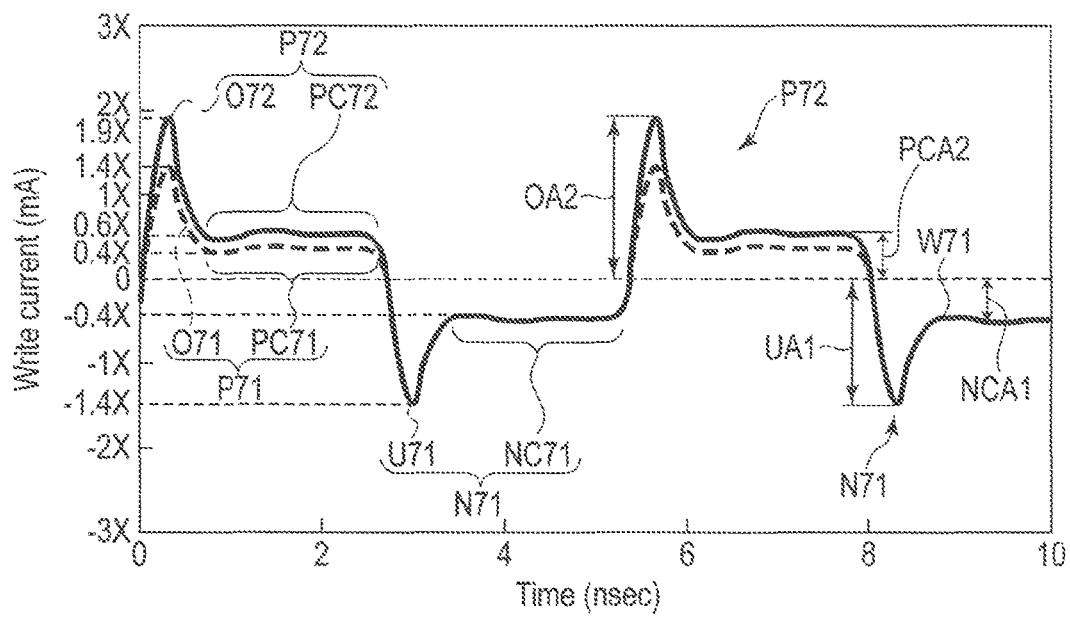
FIG. 9 is a view showing an example of a waveform of a recording current in which a positive recording current is made greater than a negative recording current.
Figure 10:
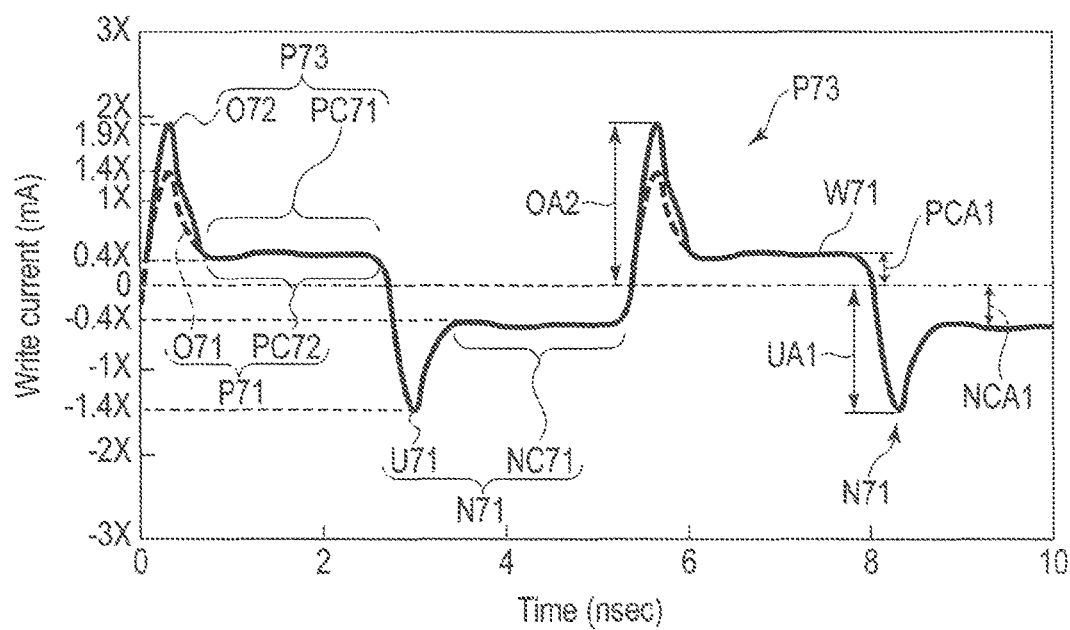
FIG. 10 is a view showing an example of a waveform of a recording current in which the positive recording current is made greater than the negative recording current.
Figure 11:
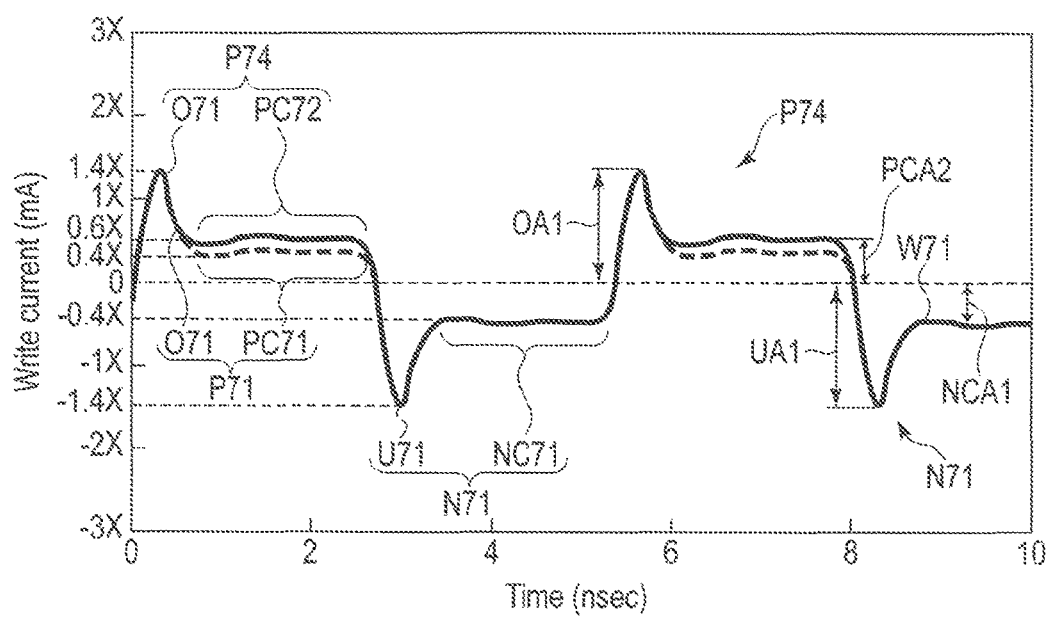
FIG. 11 is a view showing an example of a waveform of a recording current in which the positive recording current is made greater than the negative recording current.

Each of FIG. 9, FIG. 10, and FIG. 11 is a view showing an example of a waveform of a recording current in which positive and negative recording currents are different from each other according to this embodiment. Each of FIG. 9 through FIG. 11 corresponds to FIG. 7. Each of FIG. 9 through FIG. 11 is different from FIG. 7 in the magnitude of the positive recording current. Regarding FIG. 9 through FIG. 11, a detailed description of parts identical to FIG. 7 is omitted, and points different from FIG. 7 will be described below.

With reference to FIG. 9 through FIG. 11, some examples of the waveform of a recording current in which positive and negative recording currents are different from each other according to this embodiment will be shown. It should be noted that waveforms of recording currents shown in FIG. 9 through FIG. 11 are only examples, and the waveform of the recording current is not limited to these waveforms of the recording currents.

FIG. 9 is a view showing an example of a waveform of a recording current in which the positive recording current is made greater than the negative recording current. In FIG. 9, a waveform P72 of the positive recording current is shown. In FIG. 9, the waveform P72 of the positive recording current and the waveform N71 of the negative recording current are periodically repeated. In FIG. 9, the waveform P71 of the positive recording current shown in FIG. 7 is shown by a broken line for comparison. The waveform P72 includes an overshoot O72 and a positive current PC72. In FIG. 9, an amplitude OA2 of the overshoot O72 and an amplitude PCA2 of the positive current PC72 are shown. The amplitude OA2 is greater than the amplitude PCA2. The recording current of the waveform P72 is greater than the recording current of the waveform P71. That is, in FIG. 9, the waveform P72 and the waveform N71 are asymmetrical with respect to a certain recording current, for example, a recording current 0 [mA]. When the above state is expressed in terms of an asymmetry factor, the following expressions are obtained.

$$(OA2-UA1)/(OA2+UA1)>0, (PCA2-NCA1)/(PCA2+NCA1)>0$$

That is, the waveform P72 and the waveform N71 are different from each other in amplitude. In the example shown in FIG. 9, the overshoot O72 is about 1.9× [mA]. Further, the current PC72 is about 0.6 [mA]. It should be noted that although it has been described, in FIG. 9, that in the waveform W71, the waveform P72 and the waveform N71 are periodically repeated, the waveform P72 and the waveform N71 may not be periodically repeated.

FIG. 10 is a view showing an example of a waveform of a recording current in which the positive recording current is made greater than the negative recording current. In FIG. 10, a waveform P73 of a positive recording current is shown.

In FIG. 10, in the waveform W71, a waveform P73 of a positive recording current and a waveform N71 of a negative recording current are periodically repeated. In FIG. 10, the waveform P71 of the positive recording current shown in FIG. 7 is shown by a broken line for comparison. The waveform P73 includes an overshoot O72 and a positive current PC71. The overshoot O72 is greater than the overshoot O71. That is, in FIG. 10, the waveform P73 and the waveform N71 are asymmetrical with respect to a certain recording current, for example, a recording current 0 [mA]. When the above state is expressed in terms of an asymmetry factor, the following expressions are obtained.

$(OA2-UA1)/(OA2+UA1)>0, (PCA1-NCA1)/(PCA1+NCA1)=0$

That is, the waveform P73 and the waveform N71 are different from each other in amplitude. It should be noted that although it has been described, in FIG. 10, that in the waveform W71, the waveform P73 and the waveform N71 are periodically repeated, the waveform P73 and the waveform N71 may not be periodically repeated.

FIG. 11 is a view showing an example of a waveform of a recording current in which the positive recording current is made greater than the negative recording current. In FIG. 11, a waveform P74 of a positive recording current is shown. In FIG. 11, in the waveform W71, a waveform P74 of a positive recording current and a waveform N71 of a negative recording current are periodically repeated. In FIG. 11, the waveform P71 of the positive recording current shown in FIG. 7 is shown by a broken line for comparison. The waveform P74 includes an overshoot O71 and a positive current PC72. The positive current PC72 is greater than the positive current PC71. That is, in FIG. 11, the waveform P74 and the waveform N71 are asymmetrical with respect to a certain recording current, for example, a recording current 0 [mA]. When the above state is expressed in terms of an asymmetry factor, the following expressions are obtained.

$(OA1-UA1)/(OA1+UA1)=0, (PCA2-NCA1)/(PCA2+NCA1)>0$

That is, the waveform P74 and the waveform N71 are different from each other in amplitude. It should be noted that although it has been described, in FIG. 11, that in the waveform W71, the waveform P74 and the waveform N71 are periodically repeated, the waveform P74 and the waveform N71 may not be periodically repeated.

For example, the recording current control section 63 outputs one of the recording currents shown in FIG. 9 through FIG. 11 to the write head 15W, and makes the write head 15 generate a recording magnetic field having a magnitude differing depending on the direction of the magnetic flux. The recording current control section 63 outputs the positive recording current of the waveform W71 of the recording current shown in, for example, FIG. 9, FIG. 10 or FIG. 11 to the write head 15W, and makes the write head 15W generate the recording magnetic field of the magnetic flux flows MN1 and MN2 shown in FIG. 5B. The recording current control section 63 outputs the negative recording current of the waveform W71 of the recording current shown in, for example, FIG. 9, FIG. 10 or FIG. 11 to the write head 15W, and makes the write head 15W generate the recording magnetic field of the magnetic flux flows MS1 and MS2 shown in FIG. 5A. The recording current control section 63 writes data corresponding to the recording current to the target position of the disk 10 through the write head 15W. At this time, the recording current control section 63 generates a recording magnetic field of the magnetic flux flows MN1 and MN2 based on the positive recording current, and greater than the recording magnetic field of the magnetic flux flows MS1 and MS2 based on the negative recording current. Accordingly, the recording current control section 63 writes recording bits BT1 which are prolonged in the radial direction (cross-track direction) more than the recording bits BT2.

Figure 12A:
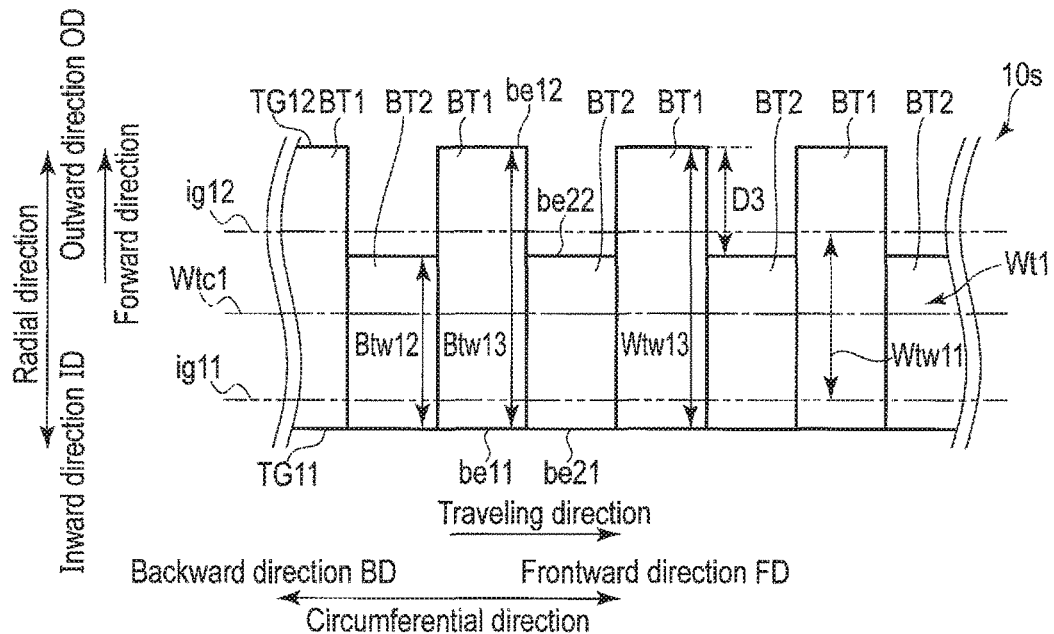
FIG. 12A is a schematic view showing an example of arrangement of recording bits according to this embodiment.
Figure 12B:
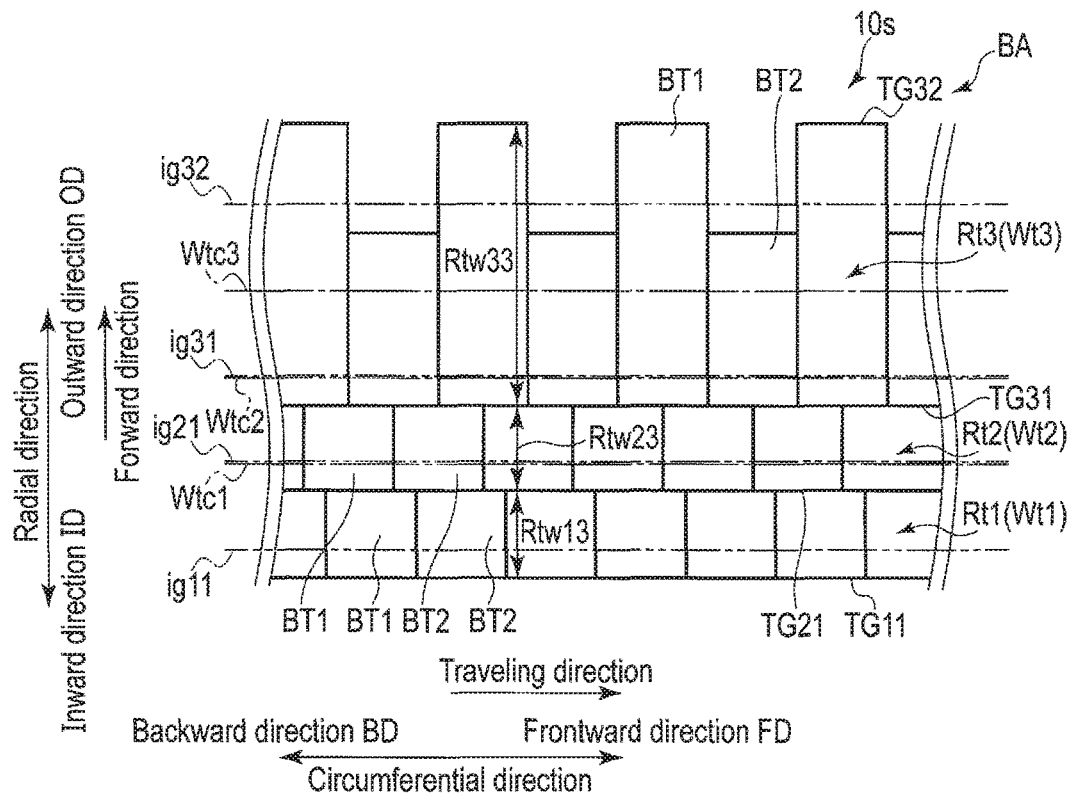
FIG. 12B is a schematic view showing an example of arrangement of recording bits according to this embodiment.

Each of FIG. 12A and FIG. 12B is a schematic view showing an example of arrangement of recording bits according to this embodiment. In FIG. 12A and FIG. 12B, the forward direction is a direction identical to the outward direction OD.

FIG. 12A and FIG. 12B correspond to FIG. 8A and FIG. 8B, respectively. The recording bit BT1 shown in FIG. 12A and FIG. 12B is different from the recording bit BT1 shown in FIG. 8A and FIG. 8B in the width in the radial direction. It should be noted that the recording bit BT2 shown in FIG. 12A and FIG. 12B is identical to the recording bit BT2 shown in FIG. 8A and FIG. 8B. Regarding FIG. 12A and FIG. 12B, a detailed description of parts identical to FIG. 8A and FIG. 8B is omitted, and points different from FIG. 8A and FIG. 8B will be described below.

FIG. 12A is a schematic view showing an example of arrangement of recording bits at the write track Wt1 written by a recording magnetic field having intensity differing according to the positive/negative polarity of the recording current.

In FIG. 12A, a width Btw13 of the recording bit BT1 in the radial direction is a width between an end part be11 and an end part be12 in the radial direction. Further, a width Btw12 of the recording bit BT2 in the radial direction is identical to that shown in FIG. 8A. In FIG. 12A, the width Btw13 is greater than the width Btw12.

In the example shown in FIG. 12A, the recording bit BT1 is prolonged in the radial direction as compared with the recording bit BT1 shown in FIG. 8A. The end part be11 of the recording bit BT1 is positioned at a position approximately identical to the end part be21 of the recording bit BT2 in the radial direction. The end part be12 of the recording bit BT1 is shifted from the end part be22 of the recording bit BT2 in the forward direction (outward direction OD). The end part be12 of the recording bit BT1 is separated from the end part be22 of the recording bit BT2 by a difference D3. For example, the difference D3 between the end part be12 and the end part be22 in the radial direction is greater than the difference D2 between the end part be12 and the end part be22 in the radial direction shown in FIG. 8A. It should be noted that although it has been described that the end part be11 is positioned at a position approximately identical to the end part be21 in the radial direction, the end part be11 may be separated from the end part be21 in the forward direction and in the radial direction by a distance smaller than the difference D3.

In FIG. 12A, the track edge TG11 linearly extends in the circumferential direction. The track edge TG12 is unevenly varied in the radial direction along a line in the circumferential direction. In FIG. 12A, a write track width Wtw13 of the write track Wt1 is shown. The write track width Wtw13 is a width between the track edge TG11 and the track edge TG12 in the radial direction. The write track width Wtw13 is varied in the radial direction along a line in the circumferential direction.

In the example shown in FIG. 12A, for example, the read/write control section 61 positions the write head 15W to a track in the vicinity of the changeover position CC shown in FIG. 6.

The recording current control section 63 writes the recording bit BT1 by the recording magnetic field of the magnetic flux flows MN1 and MN2 shown in FIG. 5B on the basis of a positive recording current, i.e., the positive recording current of the waveform W71 of the recording current shown in, for example, FIG. 9, FIG. 10 or FIG. 11, and on the basis of the adjusted value. The recording current control section 63 writes the recording bit BT2 by the recording magnetic field of the magnetic flux flows MS1 and MS2 shown in FIG. 5B on the basis of a negative recording current, i.e., the negative recording current of the waveform W71 of the recording current shown in, for example, FIG. 9, FIG. 10 or FIG. 11, and on the basis of the adjusted value. The recording current control section 63 writes the recording bit BT1 in which the end part be11 in the direction (inward direction ID) opposite to the forward direction is extended to the end part be21 of the recording bit BT2 in the direction (inward direction ID) opposite to the forward direction by a recording magnetic field based on a positive recording current, and greater than a recording magnetic field based on a negative recording current as shown in FIG. 12A.

FIG. 12B is a schematic view showing an example of a band area BA recorded by shingled magnetic recording, and by a recording magnetic field having intensity differing according to the positive/negative polarity of the recording current.

FIG. 12B shows the band area BA including read tracks Rt1, Rt2, and Rt3. The band area BA is formed in such a manner that the write track Wt1 shown in FIG. 12A is written, then the write track Wt1 is overwritten with the write track Wt2, and the write track Wt2 is overwritten with the write track Wt3.

In FIG. 12B, each of the track edges TG11, TG21, and TG31 is extended in the circumferential direction. Further, the track edge TG32 is varied in the radial direction along a line in the circumferential direction.

In FIG. 12B, a read track width Rtw13 of the read track Rt1, read track width Rtw23 of the read track Rt2, and read track width Rtw33 of the read track Rt3 are shown. The read track width Rtw13 is a width between the track edge TG11 and the track edge TG21 in the radial direction. The read track width Rtw23 is a width between the track edge TG21 and the track edge TG31 in the radial direction. Accordingly, the read track widths Rtw13 and Rtw23 are identical to each other in the circumferential direction.

Further, the read track width Rtw33 is a width between the track edge TG31 and the track edge TG32 in the radial direction. Accordingly, the read track width Rtw33 is varied in the radial direction along a line in the circumferential direction.

In the example shown in FIG. 12B, for example, the read/write control section 61 records data by shingled magnetic recording in the vicinity of the changeover position CC shown in FIG. 6 in the outward direction OD.

The recording current control section 63 outputs a recording current of the waveform W71 shown in FIG. 9, FIG. 10 or FIG. 11 to the write head 15W on the basis of the adjusted value, and records the read tracks Rt1, RT2, and Rt3 in the band area BA by shingled magnetic recording as shown in FIG. 12B. In the band area BA, the track edges TG11, TG21, and TG31 are each extended in the circumferential direction. In the example shown in FIG. 12B, the track edges TG11, TG21, and TG31 are arranged substantially in parallel with each other. Accordingly, as shown in FIG. 12B, the read track widths Rtw13 and Rtw23 are identical to each other in the circumferential direction.

Figure 13A:
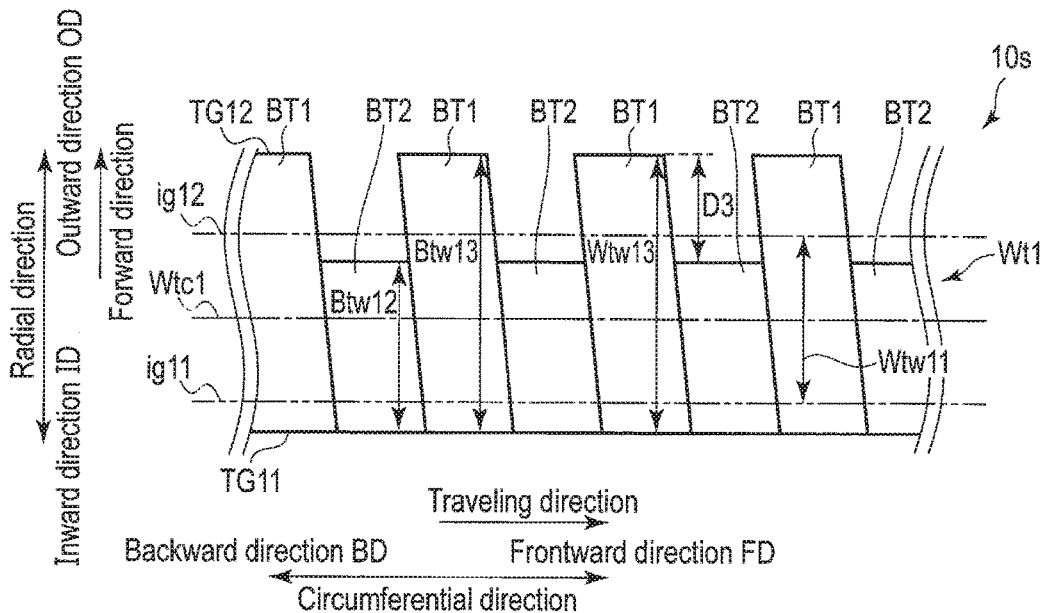
FIG. 13A is a schematic view showing an example of arrangement of recording bits according to this embodiment.
Figure 13B:
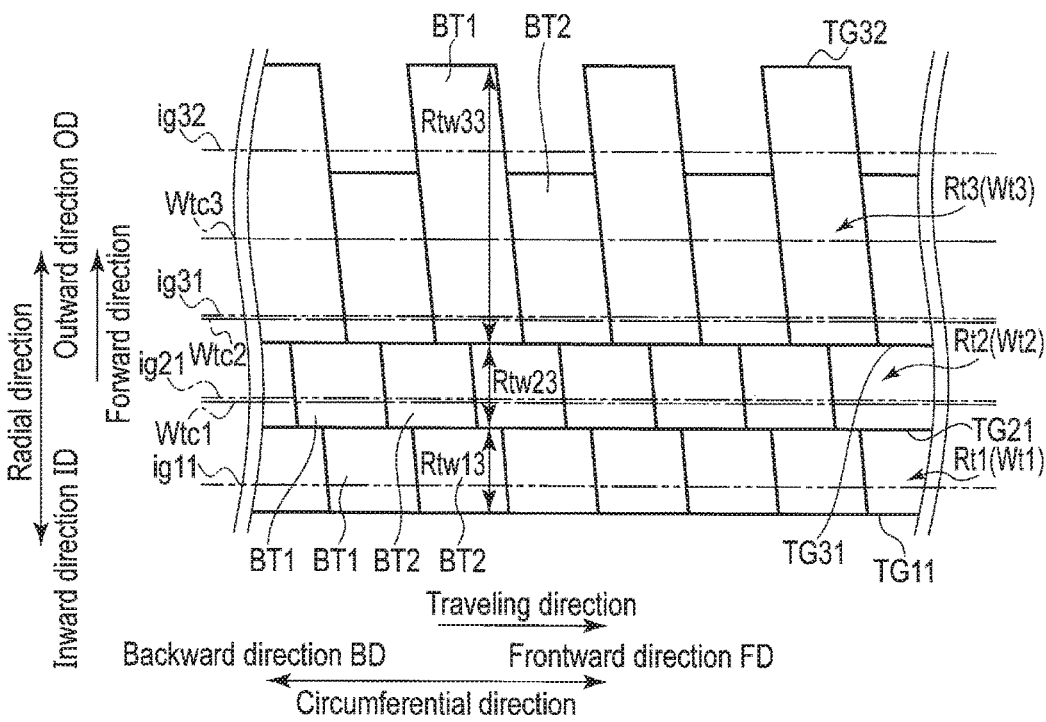
FIG. 13B is a schematic view showing an example of arrangement of recording bits according to this embodiment.

Each of FIG. 13A and FIG. 13B is a schematic view showing an example of arrangement of recording bits according to this embodiment. Each of FIG. 13A and FIG. 13B is a schematic view showing an example of arrangement of recording bits written when the head 15 has a skew angle with the circumferential direction of the disk 10. In FIG. 13A and FIG. 13B, the forward direction is a direction identical to the outward direction OD.

FIG. 13A and FIG. 13B are approximately identical to FIG. 12A and FIG. 12B, respectively. The recording bits BT1 and the recording bits BT2 shown in FIG. 13A and FIG. 13B are different from the recording bits BT1 and the recording bits BT2 shown in FIG. 12A and FIG. 12B in that the former is inclined. Regarding FIG. 13A and FIG. 13B, a detailed description of parts identical to FIG. 12A and FIG. 12B is omitted, and points different from FIG. 12A and FIG. 12B will be described below.

FIG. 13A is a schematic view showing an example of arrangement of recording bits at the write track Wt1 written by a recording magnetic field having intensity differing according to the positive/negative polarity of the recording current. FIG. 13A shows an example of arrangement of recording bits at the write track Wt1 written when the head 15 has a skew angle with the circumferential direction of the disk 10.

In the example shown in FIG. 13A, for example, the read/write control section 61 positions the write head 15W to a track in the vicinity of the inner circumference IC or the boundary position BP in FIG. 6.

The recording current control section 63 writes the recording bit BT1 as shown in FIG. 13A on the basis of the adjusted value, and on the basis of the positive recording current, for example, the positive recording current of the waveform W71 of the recording current shown in, for example, FIG. 9, FIG. 10 or FIG. 11. The recording current control section 63 writes the recording bit BT2 as shown in FIG. 13A on the basis of the adjusted value, and on the basis of a negative recording current, i.e., the negative recording current of the waveform W71 of the recording current shown in, for example, FIG. 9, FIG. 10 or FIG. 11. The recording current control section 63 writes the recording bit BT1 the track edge of which in the direction (inward direction ID) opposite to the forward direction is extended to the track edge of the recording bit BT2 in the direction (inward direction ID) opposite to the forward direction as shown in FIG. 13A by a recording magnetic field based on a positive recording current, and greater than a recording magnetic field based on a negative recording current. In this case, it is desirable that, when the head 15 has no skew angle with the circumferential direction of the disk 10, the adjusted value be identical to, for example, the example shown in FIG. 12A. It should be noted that the adjusted value may differ from the case where the head 15 has no skew angle with the circumferential direction of the disk 10.

FIG. 13B is a schematic view showing an example of a band area BA recorded by shingled magnetic recording, and by a recording magnetic field having intensity differing according to the positive/negative polarity of the recording current. FIG. 13B shows an example of an area BA recorded by shingled magnetic recording when the head 15 has a skew angle with the circumferential direction of the disk 10.

The band area BA is formed in such a manner that the write track Wt1 shown in FIG. 13A is written, then the write track Wt1 is overwritten with the write track Wt2, and the write track Wt2 is overwritten with the write track Wt3.

In the example shown in FIG. 13B, for example, the read/write control section 61 records data by shingled magnetic recording in the vicinity of the changeover position CC shown in FIG. 6 in the outward direction OD.

The recording current control section 63 outputs the recording current of the waveform W71 shown in FIG. 9, FIG. 10 or FIG. 11 to the write head 15W on the basis of the adjusted value, and records the read tracks Rt1, Rt2, and Rt3 on the band area BA by shingled magnetic recording. In this case, the track edges TG11, TG21, and TG31 are extended in the circumferential direction. In the example shown in FIG. 13B, the track edges are arranged substantially in parallel with each other. Accordingly, as shown in FIG. 13B, the read track widths Rtw13 and Rtw23 are identical to each other in the circumferential direction.

FIG. 14 is a view showing an example of a waveform of a recording current in which positive and negative magnitudes are different from each other according to this embodiment. FIG. 14 corresponds to FIG. 7 and FIG. 9. FIG. 14 is different from FIG. 7 in the magnitude of the negative recording current. Unlike FIG. 9, FIG. 14 shows a case where the negative recording current is greater than the positive recording current. Regarding FIG. 14, a detailed description of parts identical to FIG. 7 and FIG. 9 is omitted, and parts different from FIG. 7 will be described below. It should be noted that the waveform of the recording current shown in FIG. 14 is an example, and the waveform of the recording current is not limited to this.

FIG. 14 is a view showing an example of a waveform of a recording current in which the negative recording current is made greater than the positive recording current. In FIG. 14, a waveform N72 of a negative recording current is shown. In FIG. 14, in the waveform W71, a waveform P71 of a positive recording current and a waveform N72 of a negative recording current are periodically repeated. In FIG. 14, the waveform N71 of the negative recording current shown in FIG. 7 is shown by a broken line for comparison. The waveform N72 includes an undershoot U72 and a negative current NC72. In FIG. 14, an amplitude UA2 of the undershoot U72 and an amplitude NCA2 of the negative current NC72 are shown. The amplitude UA2 is greater than the amplitude NCA2. The recording current of the waveform N72 is greater than the recording current of the waveform N71. That is, in FIG. 14, the waveform P71 and the waveform N72 are asymmetrical with respect to a certain recording current, for example, a recording current 0 [mA]. When the above state is expressed in terms of an asymmetry factor, the following expressions are obtained.

$(OA1-UA2)/(OA1+UA2)<0, (PCA1-NCA2)/(PCA1+NCA2)<0$

That is, the waveform P71 and the waveform N72 are different from each other in amplitude. In the example shown in FIG. 14, the amplitude UA2 of the undershoot U72 is about 1.9× [mA]. Further, the amplitude NCA2 of the current NC72 is about 0.6 [mA]. It should be noted that although it has been described, in FIG. 14, that in the waveform W71, the waveform P71 and the waveform N72 are periodically repeated, the waveform P71 and the waveform N72 may not be periodically repeated.

For example, the recording current control section 63 outputs the recording current of the waveform W71 shown in FIG. 14 to the write head 15W, and makes the write head 15W generate a recording magnetic field having a magnitude differing depending on the direction of the magnetic flux. The recording current control section 63 outputs a positive recording current, for example, the positive recording current of the waveform P71 to the write head 15W, and makes the write head 15W generate the recording magnetic field of the magnetic flux flows MN1 and MN2 shown in FIG. 5B. The recording current control section 63 outputs a negative recording current, for example, the negative recording current of the waveform N72 to the write head 15W, and makes the write head 15W generate the recording magnetic field of the magnetic flux flows MS1 and MS2 shown in FIG. 5A. The recording current control section 63 writes data corresponding to the recording current to the target position of the disk 10 through the write head 15W. At this time, the recording current control section 63 makes the write head 15W generate the recording magnetic field of the magnetic flux flows MS1 and MS2 based on the negative recording current, and greater than the recording magnetic field of the magnetic flux flows MN1 and MN2 based on the positive recording current. Accordingly, the recording current control section 63 writes a recording bit BT2 which is more prolonged in the radial direction (cross-track direction) than a recording bit BT1.

Figure 15A:
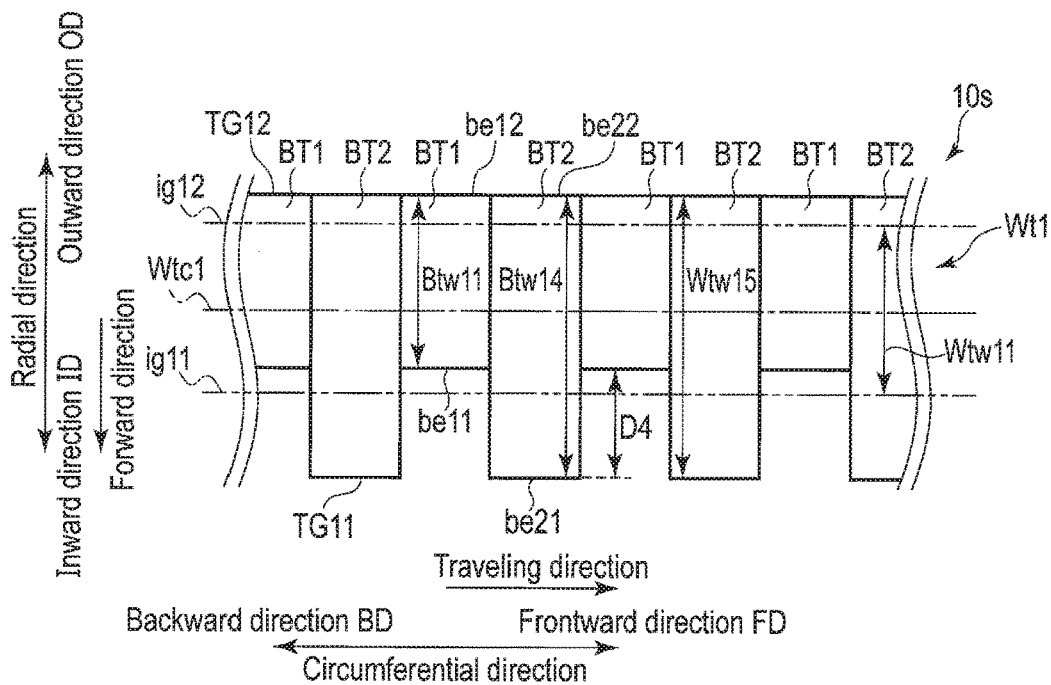
FIG. 15A is a schematic view showing an example of arrangement of recording bits according to this embodiment.
Figure 15B:
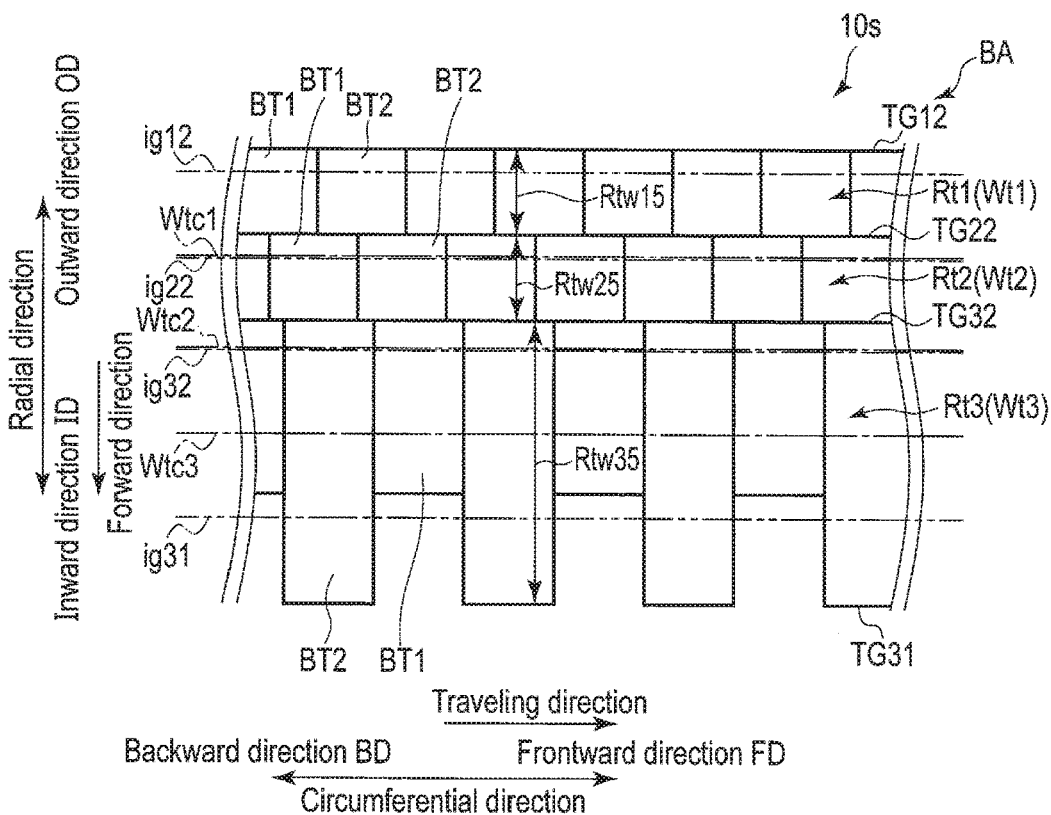
FIG. 15B is a schematic view showing an example of arrangement of recording bits according to this embodiment.

Each of FIG. 15A and FIG. 15B is a schematic view showing an example of arrangement of recording bits according to this embodiment. In FIG. 15A and FIG. 15B, the forward direction is a direction identical to the inward direction ID.

FIG. 15A and FIG. 15B correspond to FIG. 8A and FIG. 8B, and FIG. 12A and FIG. 12B, respectively. The recording bit BT2 shown in FIG. 15A and FIG. 15B differs from the recording bit BT2 shown in FIG. 8A and FIG. 8B in width in the radial direction. It should be noted that the recording bit BT1 shown in FIG. 15A and FIG. 15B is identical to the recording bit BT1 shown in FIG. 8A and FIG. 8B. Regarding FIG. 15A and FIG. 15B, a detailed description of parts identical to FIG. 8A and FIG. 8B, and FIG. 12A and FIG. 12B is omitted, and points different from FIG. 8A and FIG. 8B will be described below.

FIG. 15A is a schematic view showing an example of arrangement of recording bits at the write track Wt1 written by a recording magnetic field having intensity differing according to the positive/negative polarity of the recording current.

In FIG. 15A, a width BTw11 of the recording bit BT1 in the radial direction is identical to that shown in FIG. 8A. Further, a width Btw14 of the recording bit BT2 in the radial direction is a width between an end part be21 and an end part be22 in the radial direction.

In the example shown in FIG. 15A, the recording bit BT2 is further prolonged in the radial direction as compared with the recording bit BT2 shown in FIG. 8A. The end part be22 of the recording bit BT2 is positioned at a position approximately identical to the end part be12 of the recording bit BT1 in the radial direction. The end part be21 of the recording bit BT2 is shifted from the end part be11 of the recording bit BT1 in the forward direction (inward direction ID). The end part be21 of the recording bit BT2 is separated from the end part be11 of the recording bit BT1 by a difference D4. For example, the difference D4 between the end part be21 and the end part be11 in the radial direction is identical to the difference D3 between the end part be12 and the end part be22 in the radial direction shown in FIG. 12A. It should be noted that although it has been described that the end part be22 is positioned at a position approximately identical to the end part be12 in the radial direction, the end part be22 may be separated from the end part be12 in the radial direction by a distance smaller than the difference D4.

The track edge TG11 is unevenly varied in the radial direction along a line in the circumferential direction. In FIG. 15A, the track edge TG21 linearly extends in the circumferential direction. In FIG. 15A, a write track width Wtw15 of the write track Wt1 is shown. The write track width Wtw15 is a width between the track edge TG11 and the track edge TG12 in the radial direction. The write track width Wtw15 is varied in the radial direction along a line in the circumferential direction.

In the example shown in FIG. 15A, for example, the read/write control section 61 positions the write head 15W to a track in the vicinity of the changeover position CC shown in FIG. 6.

The recording current control section 63 writes the recording bit BT1 by the recording magnetic field of the magnetic flux flows MN1 and MN2 shown in FIG. 5B on the basis of the adjusted value, and on the basis of a positive recording current, for example, the positive recording current of the waveform P71 shown in FIG. 14. The recording current control section 63 writes the recording bit BT2 by the recording magnetic field of the magnetic flux flows MS1 and MS2 shown in FIG. 5A on the basis of the adjusted value, and on the basis of a negative recording current, for example, the negative recording current N72 shown in FIG. 14. The recording current control section 63 writes the recording bit BT2 in which the end part be22 in the direction (outward direction OD) opposite to the forward direction is extended to the end part be12 of the recording bit BT1 in the direction (outward direction OD) opposite to the forward direction as shown in FIG. 13A by a recording magnetic field based on a negative recording current, and greater than a recording magnetic field based on a positive recording current.

FIG. 15B is a schematic view showing an example of a band area BA recorded by shingled magnetic recording, and by a recording magnetic field having intensity differing according to the positive/negative polarity of the recording current.

FIG. 15B shows the band area BA including read tracks Rt1, Rt2, and Rt3. The band area BA is formed in such a manner that the write track Wt1 shown in FIG. 15A is written, then the write track Wt1 is overwritten with the write track Wt2, and the write track Wt2 is overwritten with the write track Wt3.

In FIG. 15B, the track edge TG12 of the read track Rt1 in the direction opposite to the forward direction, track edge TG22 of the read track Rt2 in the direction opposite to the forward direction, track edge TG31 of the read track Rt3 in the forward direction, and track edge TG32 of the read track Rt3 in the direction opposite to the forward direction are shown.

In FIG. 15B, the track edges TG12, TG22, and TG32 are each extended in the circumferential direction. In the example shown in FIG. 15B, the track edges TG12, TG22, and TG32 are arranged approximately in parallel with each other. Further, the track edge TG31 is varied in the radial direction along a line in the circumferential direction.

In FIG. 15B, a read track width Rtw15 of the read track Rt1, read track width Rtw25 of the read track Rt2, and read track width Rtw35 of the read track Rt3 are shown. The read track width Rtw15 is a width between the track edge TG12 and the track edge TG22 in the radial direction. The read track width Rtw25 is a width between the track edge TG22 and the track edge TG32 in the radial direction. Accordingly, the read track widths Rtw15 and Rtw25 are identical to each other in the circumferential direction.

Further, the read track width Rtw35 is a width between the track edge TG32 and the track edge TG31 in the radial direction. Accordingly, the read track width Rtw35 is varied in the radial direction along a line in the circumferential direction.

In the example shown in FIG. 15B, for example, the read/write control section 62 records data by shingled magnetic recording in the vicinity of the changeover position CC shown in FIG. 6 in the inward direction ID.

The recording current control section 63 outputs the recording current of the waveform W71 shown in FIG. 14 to the write head 15W on the basis of the adjusted value, and records the read tracks Rt1, Rt2, and Rt3 on the band area BA by shingled magnetic recording as shown in FIG. 15B. In the band area BA, the track edges TG12, TG22, and TG32 are extended in the circumferential direction. Accordingly, as shown in FIG. 15B, the read track widths Rtw15 and Rtw25 are identical to each other in the circumferential direction. It should be noted that in the examples shown in FIG. 15A and FIG. 15B, even when the head 15 has a skew angle with the circumferential direction of the disk 10, the read track widths Rtw15 and Rtw25 are identical to each other in the circumferential direction.

The adjusting section 65 adjusts the recording current to be output to the write head 15W. The adjusting section 65 overwrites a certain track of the disk 10 with data at a certain recording current. The adjusting section 65 reads the overwritten track (read track) to thereby detect the bit error rate (BER). The adjusting section 65 repetitively detects the bit error rate in a certain range of the disk 10 while changing the magnitude of the positive recording current or the negative recording current in the recording current. For example, when the variation in the read track width is small, the bit error rate can become small. The adjusting section 65 writes information indicating a relationship between the position of the disk 10, positive recording current, negative recording current, and bit error rate to a nonvolatile recording area of, for example, the nonvolatile memory 80, media cache area 10$m$ or the like as the adjusted value. It should be noted that the adjusting section 65 may write only the optimum recording current, for example, a recording current which makes the bit error rate lowest in a certain range of the disk 10 to the memory as the adjusted value. Further, the adjusting section 65 may adjust a recording current in which the positive and negative recording currents are identical to each other to the optimum value before adjusting the positive recording current and the negative recording current.

Each of FIG. 16 and FIG. 17 is a view showing a relationship between the recording current and the bit error rate. In FIG. 16 and FIG. 17, the horizontal axis indicates the negative recording current, and the vertical axis indicates the positive recording current. In FIG. 16 and FIG. 17, each of upper numerical values of the horizontal axis (negative recording current) indicates a negative overshoot, each of lower numerical values of the horizontal axis indicates a negative recording current. Each of outer numerical values of the vertical axis (positive recording current) indicates a positive overshoot, and each of inner numerical values of the vertical axis indicates a positive current. In FIG. 16 and FIG. 17, positive and negative overshoots are in the following relationship. Z1<Z2<Z3 Positive and negative currents are in the following relationship. Y1<Y2<Y3 Further, in FIG. 16 and FIG. 17, parts having deeper colors indicate that the BER is better, and parts having lighter colors indicate that the BER is worse. That is, in FIG. 16 and FIG. 17, parts of the deeper colors indicate that the BER is low, and parts of the lighter colors indicate that the BER is high. Further, in FIG. 16 and FIG. 17, the area α0 indicates a BER of a case where the positive recording current and the negative recording current are approximately identical to each other. The area α1 indicates a BER of a case where the negative recording current is greater than the positive recording current. The area α2 indicates a BER of a case where the positive recording current is greater than the negative recording current.

FIG. 16 is a view showing a relationship between the recording current and the bit error rate of a case where data is recorded by shingled magnetic recording in the outward direction OD. FIG. 16 corresponds to, for example, the examples shown in FIG. 9 through FIG. 13B. In FIG. 16, the BER in the area α2 is better than the BER in the area α1.

The adjusting section 65 repetitively detects the bit error rate in the outward direction on the disk 10 while changing the magnitude of the recording current. The adjusting section acquires information indicating a relationship between the recording current and the bit error rate shown in FIG. 16. The adjusting section 65 writes a recording current providing the lowest bit error rate from the information indicating the relationship between the recording current and the bit error rate shown in FIG. 16 to a nonvolatile recording area of, for example, the nonvolatile memory 80, media cache area 10m or the like as the adjusted value. In this case, the adjusted value includes, for example, a positive recording current greater than a negative recording current.

FIG. 17 is a view showing a relationship between the recording current and the bit error rate of a case where data is recorded by shingled magnetic recording in the inward direction ID. FIG. 17 corresponds to, for example, the examples shown in FIG. 14 through FIG. 15B. In FIG. 17, the BER in the area α1 is better than the BER in the area α2.

The adjusting section 65 repetitively detects the bit error rate in the outward direction on the disk 10 while changing the magnitude of the recording current. The adjusting section 65 acquires information indicating a relationship between the recording current and the bit error rate shown in FIG. 16. The adjusting section 65 writes a recording current providing the lowest bit error rate from the information indicating the relationship between the recording current and the bit error rate shown in FIG. 16 to a nonvolatile recording area of, for example, the nonvolatile memory 80, media cache area 10m or the like as the adjusted value. In this case, the adjusted value includes, for example, a negative recording current greater than a positive recording current.

Figure 18:
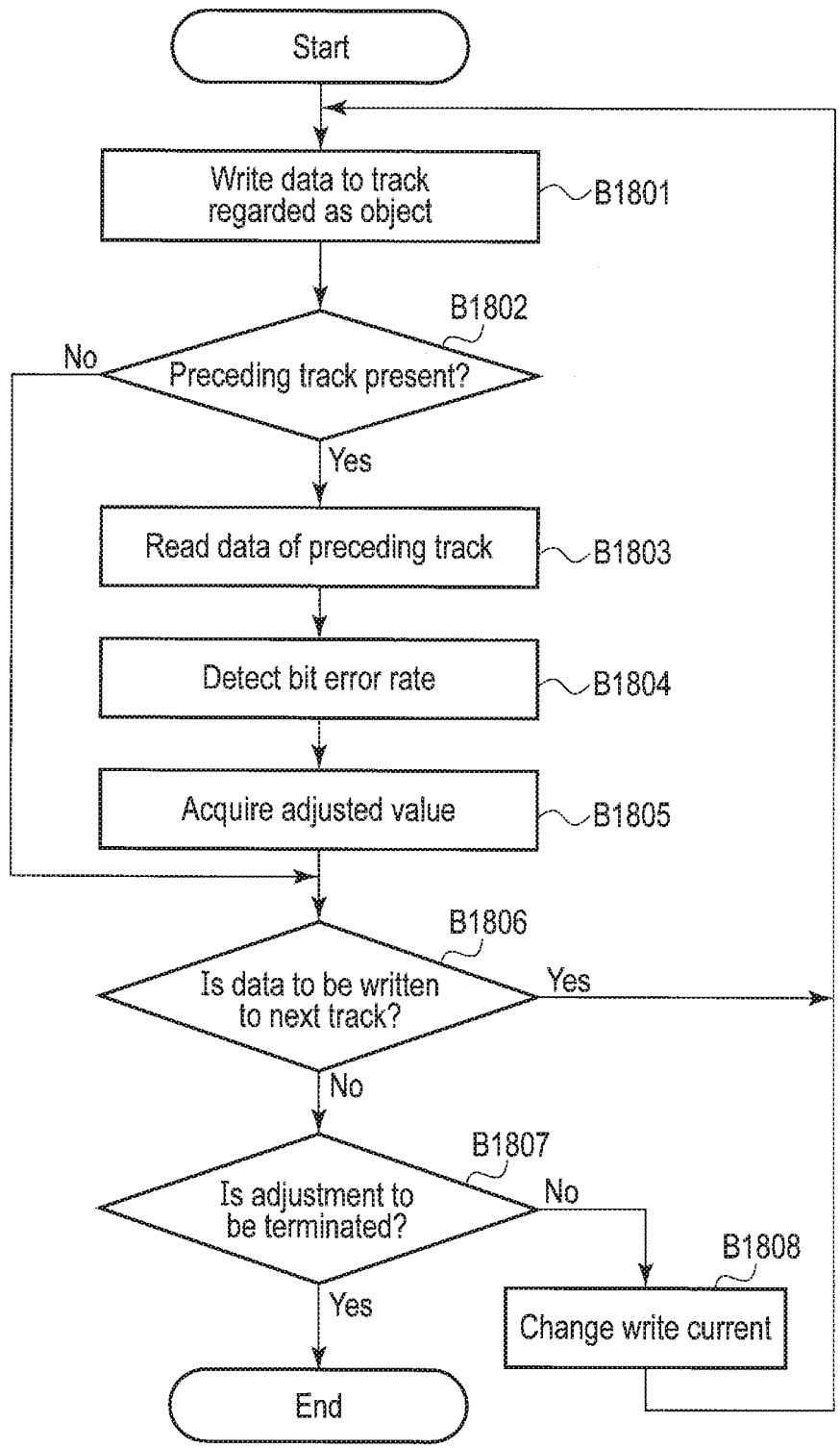
FIG. 18 is a flowchart showing an example of an adjustment method of a recording current.

FIG. 18 is a flowchart showing an example of an adjustment method of a recording current.

The system controller 130 writes data to a track regarded as an object (B1801). The system controller 130 determines whether or not there is an adjacent track (hereinafter referred to as a preceding track) in the direction opposite to the forward direction (B1802). When it is determined that there is no preceding track (B1802), the system controller 130 advances to the processing of B1806. When it is determined that there is a preceding track (Yes in B1802), the system controller 130 reads data of the preceding track (B1803), and detects a bit error rate of the read data (B1804). The system controller 130 acquires an adjusted value including the position of the disk 10, recording current, bit error rate, and the like (B1805). The system controller 130 determines whether or not data is to be written to the track (hereinafter referred to as the next track) adjacent in the forward direction (B1806). When it is determined that data is to be written to the next track (Yes in B1806), the system controller 130 advances to the processing of B1801. When it is determined that data is not to be written to the next track (No in B1806), the system controller 130 determines whether or not the adjustment is to be terminated (B1807). When it is determined that the adjustment is not to be terminated (No in B1807), the system controller 130 changes the recording current (B1808), and advances to the processing of B1801.

When it is determined that the adjustment is to be terminated (Yes in B1807), the system controller 130 terminates the processing.

FIG. 19 is a flowchart showing an example of a data writing method according to this embodiment.

The system controller 130 moves the head 15 to a track regarded as the object (B1901). The system controller 130 reads the adjusted value from a memory, for example, the volatile memory 70, nonvolatile memory 80 or buffer memory 90 (B1902). The system controller 130 controls the recording current on the basis of the adjusted value (B1903), writes data to the track regarded as the object by a recording magnetic field corresponding to the recording current (B1904), and terminates the processing.

According to this embodiment, the magnetic disk device 1 outputs a recording current having a magnitude differing according to the positive/negative polarity thereof to the write head 15W, and makes the write head 15W generate a recording magnetic field having a magnitude differing according to the direction of the magnetic field because a magnetic field in the magnetization direction MGH in the side shields 174 and 175 acts on the recording magnetic field. The magnetic disk device 1 can prevent one of the track edges in the radial direction of the recording bit corresponding to the positive recording current and the recording bit corresponding to the negative recording current from being varied. Accordingly, the magnetic disk device 1 can easily adjust the track pitch between adjacent tracks. Therefore, the magnetic disk device 1 can improve the track density and the bit error rate. In this embodiment, it is possible to provide a magnetic disk device 1 in which the recording capacity and the recording quality can be improved.

It should be noted that although it has been described that in the magnetic disk device 1, data is written by shingled magnetic recording, data may be written by conventional magnetic recording (CMR) other than the shingled magnetic recording. In this case, in the magnetic disk device 1, it is possible to improve the response characteristics of the head 15 differing depending on the positive/negative polarity of the current.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head including a main pole configured to apply a recording magnetic field to the disk, and side shields provided in a first direction with respect to the main pole and possessing a magnetic field in a magnetization direction of the first direction; and
   a controller configured to output a recording current in which a magnitude of a first electric current and a magnitude of a second electric current opposite to the first electric current in a direction of the current are different from each other to the head according to the magnetic field of the side shields, wherein the first electric current includes a first amplitude and a second amplitude greater than the first amplitude, the second electric current includes a third amplitude and a fourth amplitude greater than the third amplitude, and the controller outputs the recording current in which the first amplitude is greater than the third amplitude, and the second amplitude is greater than the fourth amplitude to the head.

2. A magnetic disk device comprising:

a disk;

a head including a main pole configured to apply a recording magnetic field to the disk, and side shields provided in a first direction with respect to the main pole and possessing a magnetic field in a magnetization direction of the first direction; and a controller configured to output a recording current in which a magnitude of a first electric current and a magnitude of a second electric current opposite to the first electric current in a direction of the current are different from each other to the head according to the magnetic field of the side shields, wherein the first electric current includes a first amplitude and a second amplitude greater than the first amplitude, the second electric current includes a third amplitude and a fourth amplitude greater than the third amplitude, and the controller outputs the recording current in which the first amplitude is identical to the third amplitude, and the second amplitude is greater than the fourth amplitude to the head.

3. A magnetic disk device comprising:

a disk;

a head including a main pole configured to apply a recording magnetic field to the disk, and side shields provided in a first direction with respect to the main pole and possessing a magnetic field in a magnetization direction of the first direction; and a controller configured to output a recording current in which a magnitude of a first electric current and a magnitude of a second electric current opposite to the first electric current in a direction of the current are different from each other to the head according to the magnetic field of the side shields, wherein the first electric current includes a first amplitude and a second amplitude greater than the first amplitude, the second electric current includes a third amplitude and a fourth amplitude greater than the third amplitude, and the controller outputs the recording current in which the first amplitude is greater than the third amplitude, and the second amplitude is identical to the fourth amplitude to the head.

4. The magnetic disk device of claim 1, wherein the controller outputs the recording current to the head, thereby writing a first track to the disk, the first track including a first track edge, and a second track edge located on a side opposite to the first track edge in a radial direction of the disk, the second track edge varying in the radial direction as compared to the first track edge, and the controller outputs the recording current to the head, thereby overwriting part of the first track near the second track edge with a second track, the second track including a third track edge located close to the first track, and a fourth track edge located on a side opposite to the third track edge in the radial direction, the fourth track edge varying in the radial direction as compared to the third track edge.

5. The magnetic disk device of claim 2, wherein the controller outputs the recording current to the head, thereby writing a first track to the disk, the first track including a first track edge, and a second track edge located on a side opposite to the first track edge in a radial direction of the disk, the second track edge varying in the radial direction as compared to the first track edge, and the controller outputs the recording current to the head, thereby overwriting part of the first track near the second track edge with a second track, the second track including a third track edge located close to the first track, and a fourth track edge located on a side opposite to the third track edge in the radial direction, the fourth track edge varying in the radial direction as compared to the third track edge.

6. The magnetic disk device of claim 3, wherein the controller outputs the recording current to the head, thereby writing a first track to the disk, the first track including a first track edge, and a second track edge located on a side opposite to the first track edge in a radial direction of the disk, the second track edge varying in the radial direction as compared to the first track edge, and the controller outputs the recording current to the head, thereby overwriting part of the first track near the second track edge with a second track, the second track including a third track edge located close to the first track, and a fourth track edge located on a side opposite to the third track edge in the radial direction, the fourth track edge varying in the radial direction as compared to the third track edge.

* * * * *